United States Patent
Lee et al.

(10) Patent No.: US 10,028,143 B2
(45) Date of Patent: Jul. 17, 2018

(54) ELECTRONIC DEVICE AND METHOD FOR EXECUTING APPLICATION OR SERVICE

(71) Applicant: Samsung Electronics Co., Ltd., Gyeonggi-do (KR)

(72) Inventors: Tae-Han Lee, Seoul (KR); Hyou-Joo Kwon, Gyeonggi-do (KR); Gih-Sung Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/211,640

(22) Filed: Jul. 15, 2016

(65) Prior Publication Data
US 2017/0118640 A1 Apr. 27, 2017

(30) Foreign Application Priority Data
Oct. 27, 2015 (KR) ........................ 10-2015-0149294

(51) Int. Cl.
*H04W 12/06* (2009.01)
*G06Q 20/40* (2012.01)
*H04L 29/06* (2006.01)

(52) U.S. Cl.
CPC ...... *H04W 12/06* (2013.01); *G06Q 20/40145* (2013.01); *H04L 63/08* (2013.01); *H04L 63/0853* (2013.01); *H04L 63/105* (2013.01)

(58) Field of Classification Search
CPC .............. G06Q 20/40145; H04L 63/08; H04L 63/0853; H04L 63/105; H04W 12/06
See application file for complete search history.

(56) References Cited

U.S. PATENT DOCUMENTS

| 7,081,905 B1 | 7/2006 | Raghunath | |
| 7,307,921 B1* | 12/2007 | Karterman | G04B 37/0427 368/295 |
| 2007/0247976 A1* | 10/2007 | Capozzi | G04G 9/0064 368/82 |
| 2008/0168386 A1* | 7/2008 | Brinda | G06F 3/0485 715/786 |
| 2014/0289827 A1 | 9/2014 | Tang | |
| 2015/0194000 A1 | 7/2015 | Schoenfelder et al. | |

(Continued)

FOREIGN PATENT DOCUMENTS

| EP | 2 306 273 | 4/2011 |
| JP | 2010081094 | 4/2010 |
| KR | 1020090025563 | 3/2009 |

(Continued)

OTHER PUBLICATIONS

European Search Report dated Feb. 7, 2017 issued in counterpart application No. 16195613.1-1870, 9 pages.

*Primary Examiner* — Frantz Bataille
(74) *Attorney, Agent, or Firm* — The Farrell Law Firm, P.C.

(57) ABSTRACT

Disclosed is a method and apparatus for executing an application or a service. The method includes determining a security level associated with an application or a service of which execution is requested, changing at least part of a graphic object based on the determined security level, and displaying the changed graphic object, obtaining an input through a body of rotation that is included in the electronic device, and executing the application or the service when the input corresponds to security information associated with the application or the service.

6 Claims, 22 Drawing Sheets

(56) References Cited

U.S. PATENT DOCUMENTS

2015/0248547 A1    9/2015  Riddiford
2015/0350207 A1*  12/2015  Kim ..................... H04L 63/105
                                                    713/170

FOREIGN PATENT DOCUMENTS

KR     1020140139942    12/2014
KR     1020140140240    12/2014

* cited by examiner

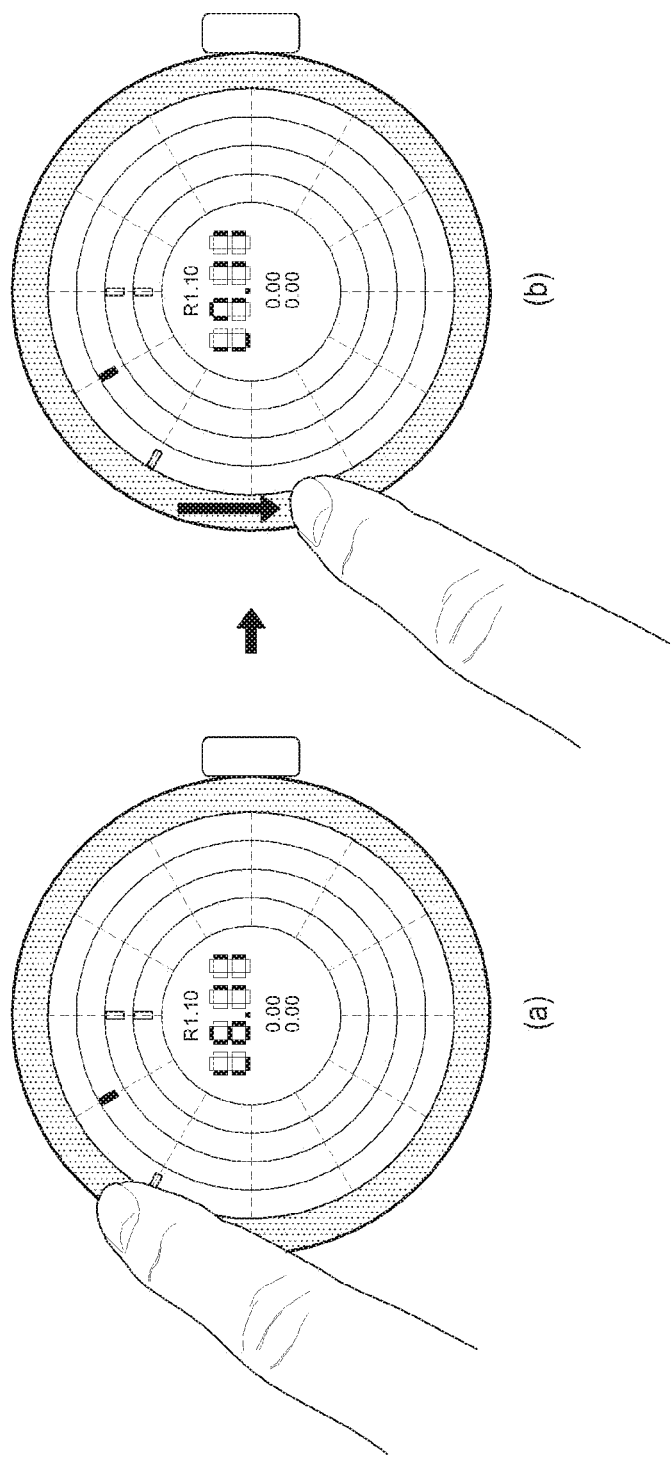

| 01 1.21 | 11 1.01 | 21 0.41 | 31 2.31 | 41 6.21 |
|---|---|---|---|---|
| 02 0.05 | 12 2.12 | 22 2.42 | 32 3.32 | 42 1.72 |
| 03 3.33 | 13 5.53 | 23 1.17 | 33 3.21 | 43 2.23 |
| 04 2.07 | 14 3.34 | 24 3.44 | 34 4.34 | 44 2.64 |
| 05 4.45 | 15 4.11 | 25 2.49 | 35 0.38 | 45 4.25 |
| 06 7.09 | 16 7.15 | 26 1.46 | 36 1.05 | 46 9.26 |
| 07 5.08 | 17 6.27 | 27 6.47 | 37 2.37 | 47 6.13 |
| 08 3.56 | 18 4.10 | 28 2.33 | 38 1.28 | 48 2.28 |
| 09 2.09 | 19 2.19 | 29 4.49 | 39 4.09 | 49 1.29 |
| 10 1.70 | 20 0.22 | 30 1.50 | 40 7.40 | 50 2.32 |

| 01 0101 | 11 4311 | 21 1821 | 31 0331 | 41 1141 |
|---|---|---|---|---|
| 02 3502 | 12 3512 | 22 7522 | 32 1832 | 42 0742 |
| 03 3303 | 13 3113 | 23 4523 | 33 6533 | 43 0843 |
| 04 0204 | 14 2514 | 24 4324 | 34 3434 | 44 3544 |
| 05 0705 | 15 1715 | 25 1825 | 35 4535 | 45 2545 |
| 06 0506 | 16 1816 | 26 1726 | 36 7636 | 46 1846 |
| 07 0607 | 17 2517 | 27 1927 | 37 4637 | 47 1147 |
| 08 0108 | 18 3318 | 28 2328 | 38 3438 | 48 2248 |
| 09 0209 | 19 3519 | 29 1629 | 39 3839 | 49 0849 |
| 10 1510 | 20 2120 | 30 8530 | 40 5540 | 50 1350 |

ELECTRONIC DEVICE AND METHOD FOR EXECUTING APPLICATION OR SERVICE

PRIORITY

This application claims priority under 35 U.S.C. § 119(a) to a Korean Patent Application, which was filed in the Korean Intellectual Property Office on Oct. 27, 2015 and assigned Serial No. 10-2015-0149294, the contents of which are incorporated herein by reference.

BACKGROUND

1. Field of the Disclosure

The present disclosure relates to a method of executing an application or a service, and an electronic device thereof, and more particularly, to a method of executing an application or a service using the body of rotation included in an electronic device.

2. Description of the Related Art

Recently, as financial transactions and product purchases have become enabled through electronic devices, when an application related thereto or a service supported in the application is used, a password needs to be input to execute the application or the service in order to secure the privacy of individuals.

As the security of the password is regarded as an important issue, the length of the password increases and becomes complex, and a password formed of a combination of capital and lower-case English letters, numbers, and symbols is created.

When a method of inputting security information such as the aforementioned password is applied to an electronic device that includes a small display, such as a wearable device, visibility is limited since all of the numbers, characters, and symbols need to be displayed in the display. A user of a touchscreen needs to touch the display, covering the display with the user's hand, so as to input the security information, and the size of the display is relatively small. Thus, it is difficult to accurately input a password in the conventional art.

As such, there is a need in the art for an improved method and apparatus for security information input.

SUMMARY

The present disclosure has been made to address at least the above-mentioned problems and/or disadvantages and to provide at least the advantages described below.

Accordingly, an aspect of the present disclosure is to provide a method and apparatus by which, when security information needs to be input for the execution of an application or a service provided in the application, the security information may be input using a body of rotation included in the electronic device.

Another aspect of the present disclosure is to provide a method and apparatus by which less than all of the numbers, characters, and symbols need to be displayed for inputting security information, and thus, visibility may be secured in a wearable electronic device that has a small display.

Another aspect of the present disclosure is to provide a method and apparatus by which a user may accurately input security information by checking a screen displayed in a display using the body of rotation included in the electronic device.

According to an aspect of embodiments of the present disclosure, there is provided an electronic device including a housing, a body of rotation formed in one side of the housing, a display formed in one lateral side of the body of rotation of the housing, and a processor that determines, based on a rotation of the body of rotation, information corresponding to the rotation, displays a graphic object for indicating the information through the display, and executes an application or a service when the information corresponding to the rotation corresponds to information set for the application or the service of which execution is requested.

According to an aspect of embodiments of the present disclosure, there is provided a method for a portable electronic device to execute an application or a service provided through the application, including determining a security level associated with the application or the service of which execution is requested, changing at least part of a graphic object based on the determined security level, and displaying the changed graphic object, obtaining an input through a body of rotation included in the electronic device, and executing the application or the service when the input corresponds to security information associated with the application or the service.

According to an aspect of embodiments of the present disclosure, there is provided a portable electronic device, including a housing, a body of rotation formed in one side of the housing, a display formed inside the body of rotation of the housing, and a processor that determines a security level associated with an application or a service of which execution is requested, changes at least part of a graphic object based on the determined security level, and displays the changed graphic object, obtains an input through the body of rotation included in the electronic device, and executes the application or the service when the input corresponds to security information associated with the application or the service.

According to an aspect of embodiments of the present disclosure, there is provided a non-transitory computer readable recording medium that records a program to be implemented on a computer, wherein the program comprises instructions that enable the processor to execute operations when the program is executed by the processor, the operations including determining a security level associated with an application or a service of which execution is requested, changing at least part of a graphic object based on the determined security level, and displaying the changed graphic object, obtaining an input through a body of rotation that is functionally connected with the electronic device, and executing the application or the service when the input corresponds to security information associated with the application or the service.

BRIEF DESCRIPTION OF THE DRAWINGS

The above and other aspects, features, and advantages of the present disclosure will be more apparent from the following detailed description taken in conjunction with the accompanying drawings, in which:

FIGS. 6A, 6B, 6C and 6D illustrate a method of adjusting an input through a body of rotation through a touch screen according to embodiments of the present disclosure;

DETAILED DESCRIPTION OF EMBODIMENTS OF THE DISCLOSURE

Figure 1:
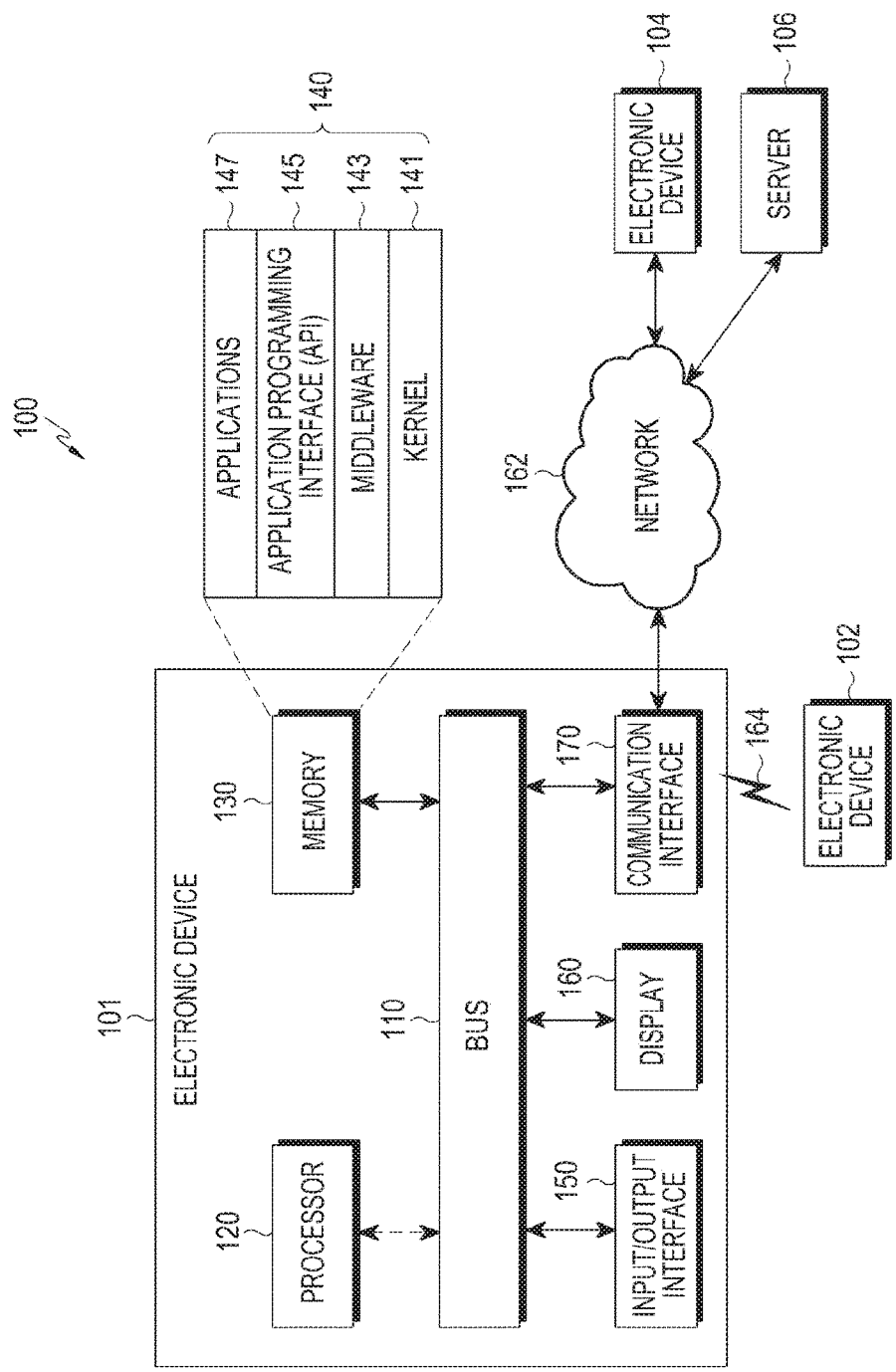
FIG. 1 illustrates a network environment including an electronic device according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

As used herein, the expressions "have", "may have", "include", and "may include" refer to the existence of a corresponding feature, such as a numeral, function, operation, or constituent element such as component, and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including at least one A, (2) including at least one B, or (3) including all of at least one A and at least one B.

The expressions "a first", "a second", "the first", and "the second" used in embodiments of the present disclosure may modify various components regardless of the order and/or the importance but do not limit the corresponding components. For example, a first user device and a second user device indicate different user devices although both are user devices. For example, a first element may be referred to as a second element, and similarly, a second element may be referred to as a first element without departing from the scope of the present disclosure.

It should be understood that when an element, such as first element, is referred to as being operatively or communicatively "connected," or "coupled," to another element, such as second element, it may be directly connected or coupled directly to the second element or any other element, such as third element, may be interposed between the first and second elements. In contrast, it may be understood that when the first element is referred to as being "directly connected," or "directly coupled" to the second element, there are no third element interposed between the first and second elements.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" indicates that the device, together with other devices or components, "is able to". For example, the phrase "processor adapted (or configured) to perform A, B, and C" indicates a dedicated processor only for performing the corresponding operations or a generic-purpose processor, such as central processing unit (CPU) or application processor (AP) that can perform the corresponding operations by executing one or more software programs stored in a memory device.

The terms used herein are merely for the purpose of describing particular embodiments and are not intended to limit the scope of other embodiments. A singular expression may include a plural expression unless they are contextually different. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, terms defined in the present disclosure should not be interpreted to exclude embodiments of the present disclosure.

An electronic device according to embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to embodiments, the wearable device may include at least one of an accessory type, such as a watch, a ring, a bracelet, an anklet, a necklace, a glasses, a contact lens, or a head-mounted device (HMD), a fabric or clothing integrated type, such as an electronic clothing), a body-mounted type, such as a skin pad, or tattoo, and a bio-implantable type, such as an implantable circuit.

According to some embodiments, the electronic device may be a home appliance. The smart home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ and PlayStation™, an electronic dictionary, an electronic key, a camcorder, and an electronic photo frame.

According to another embodiment, the electronic device may include at least one of various medical devices, such as various portable medical measuring devices including a blood glucose monitoring device, a heart rate monitoring device, a blood pressure measuring device, and a body temperature measuring device, a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship, such as a navigation device and a gyrocompass, avionics, security devices, an automotive head unit, a robot for home or industry, an automatic teller machine (ATM) in banks, point of sales (POS) device in a shop, or an Internet of Things (IoT) device, such as a light bulb, various sensors, electric or gas meter, a sprinkler device, a fire alarm, a thermostat, a streetlamp, a toaster, a sporting goods, a hot water tank, a heater, or a boiler.

According to some embodiments, the electronic device may include at least one of a part of furniture or a building/structure, an electronic board, an electronic signature receiving device, a projector, and various kinds of measuring instruments, such as a water meter, an electric meter, a gas meter, and a radio wave meter. In embodiments, the electronic device may be a combination of one or more of the aforementioned various devices. The electronic device may also be a flexible device. The electronic device is not limited to the aforementioned devices, and may include a new electronic device according to the development of technology.

Hereinafter, an electronic device according to embodiments will be described with reference to the accompanying drawings. In the present disclosure, the term "user" may indicate a person using an electronic device or a device, such as an artificial intelligence electronic device using an electronic device.

An electronic device 101 within a network environment 100, according to embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above components or may further include other components.

The bus 110 may include, for example, a circuit that interconnects the components 110 to 170 and delivers communication, such as a control message and/or data, between the components 110 to 170.

The processor 120 may include one or more of a central processing unit (CPU), an application processor (AP), and a communication processor (CP). The processor 120, for example, may carry out operations or data processing relating to the control and/or communication of at least one other component of the electronic device 101.

The memory 130 may include a volatile memory and/or a non-volatile memory. The memory 130 stores, for example, instructions or data related to at least one other component of the electronic device 101. According to an embodiment of the present disclosure, the memory 130 stores software and/or a program 140. The program 140 may include, for example, a kernel 141, middleware 143, an application programming interface (API) 145, and applications 147. At least some of the kernel 141, the middleware 143, and the API 145 may be referred to as an operating system (OS).

For example, the kernel 141 controls or manage system resources, such as the bus 110, the processor 120, and the memory 130, which are used to execute an operation or a function implemented in the other programs, such as the middleware 143, the API 145, and the applications 147. Furthermore, the kernel 141 provides an interface through which the middleware 143, the API 145, or the applications 147 may access the individual components of the electronic device 101 to control or manage the system resources.

The middleware 143 may function as, for example, an intermediary for allowing the API 145 or the application programs 147 to communicate with the kernel 141 to exchange data.

The middleware 143 processes one or more task requests, which are received from the applications 147, according to priorities thereof. For example, the middleware 143 may assign, to at least one of the application programs 147, priorities for using the system resources, such as the bus 110, the processor 120, or the memory 130 of the electronic device 101. For example, the middleware 143 performs scheduling or loading balancing on the one or more task requests by processing the one or more task requests according to the priorities assigned thereto.

The API 145 is an interface through which the applications 147 control the functions provided from the kernel 141 or the middleware 143, and may include, for example, at least one interface or function for file control, window control, image processing, text control, or the like.

The input/output interface 150, for example, may function as an interface that may transfer an instruction or data input from a user or another external device to the other component(s) of the electronic device 101. Furthermore, the input/output interface 150 may output the instruction or data received from the other component(s) of the electronic device 101 to the user or another external device.

The display 160 may include, for example, a liquid crystal display (LCD), a light-emitting diode (LED) display, an organic light-emitting diode (OLED) display, a micro-electromechanical systems (MEMS) display, and an electronic paper display. The display 160 displays, for example, various types of contents, such as text, images, videos, icons, or symbols to the user. The display 160 may include a touch screen and receive, for example, a touch, gesture, proximity, or hovering input using an electronic pen or a user's body part.

The communication interface 170 sets communication between, for example, the electronic device 101 and an external device 102, a second external electronic device 104, or a server 106. For example, the communication interface 170 may be connected to the network 162 through wireless or wired communication to communicate with the second external electronic device 104 or the server 106.

The wireless communication may use, for example, at least one of long term evolution (LTE), LTE-advanced (LTE-A), code division multiple access (CDMA), wideband CDMA (WCDMA), universal mobile telecommunications system (UMTS), WiBro wireless broadband (WiBro), and global system for mobile communications (GSM) as a cellular communication protocol. In addition, the wireless communication may include, Wireless communication 164. The wireless communication 164 may include at least one of, Wi-Fi, Bluetooth™, near field communication (NFC), and global navigation satellite system (GNSS). The GNSS may include at least one of, for example, a global positioning system (GPS), a global navigation satellite system (Glonass), a Beidou navigation satellite system (hereinafter referred to as "Beidou"), and a European global satellite-based navigation system (Galileo) according to a use area or a bandwidth, for example. Hereinafter, in the present disclosure, the "GPS" may be interchangeably used with the "GNSS". The wired communication may include at least one of, for example, a universal serial bus (USB), a high definition multimedia interface (HDMI), recommended standard 232 (RS-232), and a plain old telephone service (POTS) for example. The network 162 may include at least one of a communication network, such as a computer network, such as a local area network (LAN) or a wide area network (WAN), the Internet, and a telephone network.

Each of the first and second external electronic devices 102 and 104 may be the same as, or different from, the electronic device 101. According to an embodiment of the present disclosure, the server 106 may include a group of one or more servers. All or some of the operations performed in the electronic device 101 may be performed in another electronic device or a plurality of electronic devices 102 and 104, or may be performed in the server 106. When the electronic device 101 has to perform some functions or services automatically or by request, the electronic device 101 may make a request for performing at least some functions relating thereto to another device, such as the electronic device 102 or 104 or the server 106, instead of or in addition to, autonomously performing the functions or services. The electronic device 102 or 104 or the server 106 executes the requested functions or the additional functions, and may deliver the result of the execution to the electronic device 101, which provides the received result as it is, or may additionally process the received result and provide the requested functions or services. To this end, for example, cloud computing, distributed computing, or client-server computing technologies may be used.

The processor 120 processes at least some of the information obtained from other components, such as at least one of the memory 130, the input/output interface 150, and the communication interface 170, and may utilize the information in various manners. For example, the processor 120 controls at least some functions of the electronic device 101 to enable the electronic device 101 to interwork with other electronic devices, such as the electronic device 102 or 104 or the server 106. The processor 120 may be integrated with the communication interface 170. According to an embodiment of the present disclosure, at least one component of the processor 120 may be included in the server 106, and at least one operation implemented in the processor 120 may be supported by the server 106.

According to an embodiment of the present disclosure, the memory 130 may include instructions that enable the processor 120 to operate. For example, the memory 130 may include instructions that enable the processor 120 to control other components of the electronic device 101, and to interwork with another electronic device 102 or 104 or the server 106. The processor 120 controls the other components of the electronic device 101, and may interwork with another electronic device 102 or 104, or the server 106 based on the instructions stored in the memory 130. Hereinafter, the operations of the electronic device 101 will be described from the perspective of each of the components of the electronic device 101. The instructions that enable an operation of each component to be executed may be included in the memory 130.

The components included in the electronic device 101 may be included in the housing of the electronic device 101.

According to embodiments of the present disclosure, a body of rotation is formed in one side of the housing. The body of rotation, such as a bezel, a stem, or a rotary button, is formed to physically rotate and to be rotated by the force from the outside, such as by user operation. Information corresponding to the rotation of the body of rotation, which is made by the force from the outside, may be recognized by the body of rotation itself; and may be transferred to other components, such as the processor 120 of the electronic device 101. Based on the rotation of the body of rotation, the processor 120 obtains information associated with the rotation.

When the body of rotation is rotated by the force applied from the outside, the processor 120 obtains information associated with the rotation direction of the body of rotation, the number of rotations of the body of rotation, and the rotation angle of the body of rotation, which correspond to the rotation of the body of rotation, and obtains information associated with the rotation. The processor 120 enables a physical lock to be executed or enables a vibration or sound to be output every time the body of rotation rotates once so as to inform a user that the body of rotation rotates once. The processor 120 enables a physical lock to be performed, or enables a vibration or sound to be output, for each predetermined rotation angle.

According to an embodiment of the present disclosure, at least a part of the body of rotation is functionally connected with a pressure sensing sensor that is capable of sensing pressure, such as a pressure sensor, a force sensor, or a dome switch, and obtains a pressure applied by the body of rotation. When a user presses the body of rotation at a constant force, the force that the user applies to the body of rotation may be measured. The electronic device performs a predetermined operation based on a pressure value corresponding to the force applied to the body of rotation. When the user presses the body of rotation with a first force, the electronic device displays a first password pattern. When the user presses the body of rotation with a second force, the electronic device displays a second password pattern that is different from the first password pattern.

According to an embodiment of the present disclosure, when the body of rotation is pressed, the electronic device performs an operation that is identical to an operation executed when an 'enter' key is pressed in a computer. For example, when the user inputs a password using rotation of the body of rotation, and presses the body of rotation, the electronic device executes an operation that is actually input into the electronic device as an operation of confirming the password.

As described above, the body of rotation may be used as one of the input means of the electronic device 101. The processor 120 performs a predetermined function of an application or a service based on information associated with rotation that is based on the rotation of the body of rotation or information associated with the magnitude of force applied to the body of rotation. For example, based on a rotation direction that is included in the information associated with the rotation, when the rotation direction is to the right, the processor 120 performs a first function of the application or the service. When the rotation direction is to the left, the processor 120 performs a second function of the application or the service.

When security information needs to be input so as to execute an application or a service, the information associated with the rotation may be used to input the security information. For example, the security information may be set to correspond to the information associated with rotation. Accordingly, when a user rotates the body of rotation to correspond to the security information set in advance, the application or the service may be executed. In other words, security information that is generally input through a touch screen or the like may be input through the body of rotation.

The body of rotation may be provided in various shapes based on a shape and a type of electronic device 101. For example, when the electronic device 101 is a smart watch, the body of rotation is formed as a bezel that is in a shape identical to the display of the smart watch, or is formed as the stem of the smart watch. When the display of the smart watch is in a circular shape, the body of rotation is formed in a circular shape including at least a part of the display, or as a rotary button that is separately prepared in the smart watch. For example, the body of rotation is formed in at least one lateral side of the smart watch. As described above, the body of rotation is formed in any shape that is physically capable of rotating, and is formed in various shapes based on the shape and the type of the electronic device 101.

According to embodiments of the present disclosure, an input through the body of rotation may be obtained or adjusted by an input from a user that is received through another input mean included in the electronic device 101. When the input through the body of rotation includes information associated with the rotation direction of the body of rotation, the number of rotations of the body of rotation, the rotation angle of the body of rotation, at least one out of the rotation direction, the number of rotations, and the rotation angle of the body of rotation may be obtained or adjusted by a touch input, an electronic pen input, a hovering input, or a force touch provided from a user, which may be received through the display 160. A detailed method of obtaining or adjusting an input through the body of rotation, through another input means that is different from the body of rotation, will be described.

According to embodiments of the present disclosure, the display 160 is formed in at least one lateral side of the body of rotation. For example, when the body of rotation is a bezel, the display is formed inside the body of rotation. When the body of rotation is a stem, the display is formed in one lateral side of the stem.

According to embodiments of the present disclosure, the processor 120 determines a security level associated with an application or a service provided in the application, of which execution is requested. The service may include various functions provided by the application, a function of the electronic device 101 that may be utilized through the application, or the like. The execution of the application or the service may be requested by an input from a user, or may be requested by a request of another electronic device 102 or 104. The processor 120 determines the security level associated with the application or the service in response to an input from a user or a request from another electronic device for executing the application or the service.

The security level may be set for each of a plurality of applications, or for each of a plurality of services provided in each of the plurality of applications. Also, security may not be set for a predetermined application. In this instance, the processor 120 may not determine a security level when executing the predetermined application.

For example, it is assumed that security is set for a finance application for financial transaction, and security is not set for a photo application. When a user desires to execute the finance application, the processor 120 determines a security level set for the finance application. Conversely, when the user desires to execute the photo application, the processor 120 may not separately execute determining a security level since the security is not set for the photo application.

A security level may be set to be different for each application. For example, the security level of the finance application may be set to have a higher degree of security than the security level of a messenger application to which security is set.

In addition, a security level or whether security is set may be set to be different for each of a plurality of services provided in a financial application. For example, security may be set with respect to a first service provided in the finance application, and security may not be set with respect to a second service provided in the finance application. The security level of a first service is set to a first security level, and the security level of a third service, which is another service to which security is set, is set to a third security level.

As described above, the security level may be set to be different for each application or service, based on the degree of security required by an application or a service. Hereinafter, the description will be provided by assuming that a security level increases as the degree of security required by an application or a service increases, and the security level decreases as the required degree of security decreases. However, this is merely for illustrative purposes, and the present disclosure is not limited thereto. As such, the security level may be set in various manners.

According to embodiments of the present disclosure, the processor 120 determines whether to set security with respect to an application or a service before determining the security level of the application or the service of which execution is requested. All of the applications or the services included in the electronic device 101 may not require security, and accordingly, security may not be set with respect to an application or a service that does not require security. An application or a service that requires security may be when security is not yet set with respect to the application or the service.

Therefore, before determining a security level, the processor 120 determines whether to set security with respect to the application or service. Based on the result of the determination, the processor 120 executes the application or the service of which execution is requested, or sets security with respect to the application or service of which execution is requested.

According to embodiments of the present disclosure, the processor 120 displays, in the display 160, a graphic object corresponding to an input value that is input through the body of rotation, based on the determined security level. For example, the graphic object may be configured to display the rotation direction of the body of rotation, the number of rotations of the body of rotation, and the rotation angle of the body of rotation. The graphic object is for indicating an input through the body of rotation, and may be expressed to be similar to the shape of a display or the shape of the body of rotation. The processor 120 displays information corresponding to rotation of the body of rotation as text. For example, the processor 120 displays the rotation direction of the body of rotation, the number of rotations of the body of rotation, the rotation angle of the body of rotation as numbers, characters, and symbols so that a user recognizes the same.

When the determined security level does not correspond to a graphic object that is currently displayed through a display, the processor 120 changes at least a part of the displayed graphic object based on the determined security level, and displays the changed graphic object.

According to an embodiment of the present disclosure, the processor 120 provides information corresponding to the rotation of the body of rotation through vibration, voice, or sound. For example, the processor 120 generates vibration, voice, or sound corresponding to the rotation direction of the body of rotation, the number of rotations of the body of rotation, the rotation angle of the body of rotation, and provides the same to a user. The processor 120 provides, through an external device that is functionally connected with the electronic device, a user with information, such as characters, numbers, symbols, vibration, voice, and sound, corresponding to the rotation direction of the body of rotation, the number of rotations of the body of rotation, and the rotation angle of the body of rotation.

According to embodiments of the present disclosure, at least one of the number of inputs through the body of rotation, whether to determine a rotation direction, and a rotation angle may be determined based on the security level. As the security level increases, the security is set to be increased by increasing the number of inputs through the body of rotation, by determining a rotation direction, or by subdividing a rotation angle. For example, as the security level increases, the number of inputs through the body of rotation increases. As the security level decreases, the number of inputs through the body of rotation decreases. Alternatively, as the security level increases, the number of angles that may be input by one rotation increases by subdividing a rotation angle. As the security level decreases, the number of angles that may be input by one rotation decreases by simplifying a rotation angle. In addition, when the security level is higher than a predetermined security level, the rotation direction of the body of rotation needs to be determined. When the security level is lower than the predetermined security level, the rotation direction of the body of rotation may not be determined.

Accordingly, the processor 120 displays the graphic object based on the determined security level. For example, as the security level increases, the number of inputs through the body of rotation increases, and thus, the graphic object may be displayed to indicate the number of inputs through the body of rotation, which corresponds to the determined security level. As the security level decreases, the number of inputs through the body of rotation decreases, and thus, the graphic object may be displayed to indicate the number of inputs through the body of rotation, which corresponds to the determined security level. As described above, the processor 120 changes the graphic object to correspond to the determined security level, and displays the same in the display 160.

The graphic object displaying method is merely for illustrative purposes, and the present disclosure is not limited thereto. For example, a graphic object may be expressed in various methods to indicate an input through the body of rotation.

According to embodiments of the present disclosure, the processor 120 changes a security level set for an application or a service provided in the application. When information for authenticating a user of the electronic device 101, for example, biometric information, such as a fingerprint of a user, or security information input through the input mean, or the like is received through a sensor or an input mean included in the electronic device 101, the processor 120 changes the security level set for the application or the service. For example, when direct or credit payment is performed to purchase a product or to use a service, when the electronic device 101 or an interworking device receives biometric information or corresponding security information, and successfully authenticates a user, the security level may be decreased so that the user may readily purchase a product and readily use a service. When the user uses a high security level at least once to execute payment, withdrawal, or account transfer, the security level may be decreased only when the user is not changed with another user, and continuously wears and uses the electronic device.

Changing the security level may correspond to changing and resetting the security level set for the application or the service, or may correspond to temporarily applying a changed security level to a current execution request. When the security level is temporarily changed and applied, the security level may be reset to the original security level that is used before changing when the execution of the application or the service is requested later.

When information obtained through the sensor or the input means corresponds to predetermined information, the processor 120 changes the security level of the application or the service to decrease the degree of security based on a predetermined standard. For example, when fingerprint information obtained through the sensor included in the electronic device 101 corresponds to the fingerprint information set in the electronic device 101, the security level set for the application or the service may be decreased. The degree of lowering the security level may be variously applied based on a predetermined standard.

Conversely, when information obtained through the sensor or the input means does not correspond to the predetermined information, the processor 120 changes the security level of the application or the service to increase the degree of security based on the predetermined standard. For example, when fingerprint information obtained through the sensor included in the electronic device 101 does not correspond to the fingerprint information set in the electronic device 101, the security level set for the application or the service may be increased. The degree of raising the security level may also be applied based on a predetermined standard.

As described above, the processor 120 changes a security level set for an application or a service of which execution is requested based on information used for authenticating the user of the electronic device 101, such as biometric information.

The security level is changed based on a relationship between the electronic device 101 and a device that interworks with the electronic device 101, and the state of the interworking device, such as the setup state of the interworking device. For example, when a mobile device that interworks with a wearable device corresponding to the electronic device 101 successfully interworks with the wearable device, when information between the mobile device and the wearable device is identical to information that is stored in advance, a security level may be decreased. Alternatively, when a high security level is used at least once when they interwork together, the security level may be maintained to be low until interworking is disconnected.

When the interworking device is a safe or a personal locker, the safe or the locker may require high security when a predetermined condition is satisfied, such as an attempt to force the safe or locker, wrong inputting a password at least a predetermined number of times, or when the electronic device 101 is changed). When the interworking device is a vehicle, the security level may be increased when the distance to the electronic device 101 is far or becomes far. However, this is merely for illustrative purposes, and the present disclosure is not limited thereto, and the security level may be set in various methods based on a relationship between the electronic device 101 and the interworking device or devices.

As described above, the electronic device 101 changes the security level based on at least one out of: state information of at least one of the electronic device and a device that interworks with the electronic device, relationship information between the electronic device and the interworking device, and information associated with a user, which are obtained through various sensors included in the electronic device 101.

According to embodiments of the present disclosure, the processor 120 may compare the security level of an application or a service of which execution is requested with an existing security level, and when the security level has a change when compared to the existing security level, displays, on a screen, information indicating that the change exists, and provides a guidance in association with an input. When the number of inputs through a body of rotation is decreased from 4 to 2, guidance associated with how many times inputting needs to be performed through the body of rotation may be provided, and may be randomly changed based on a setting of the processor.

According to an embodiment of the present disclosure, when the security level is changed, the processor 120 changes the graphic object so as to indicate an input through the body of rotation based on the changed security level, and displays the changed graphic object. A detailed method of changing and displaying the graphic object will be described later.

According to embodiments of the present disclosure, when an input through the body of rotation corresponds to information set for an application or a service of which execution is requested, the processor 120 executes the application or the service. When a password value input through the body of rotation is identical to a password value set for the application or the service, the processor 120 executes the application or the service. When the input through the body of rotation corresponds to the set information, the processor 120 transmits, to another electronic device on the outside, information indicating that the input through the body of rotation corresponds to the set security information. When the value input through the body of rotation is identical to the set security information, the electronic device transmits information, such as TEXT, characters, a message, vibration, or sound, associated with the sameness to an external device that is functionally connected with the electronic device. The external other electronic device may additionally use the information received through the electronic device 101 in a process, such as user authentication or the like.

The information may be set for each of a plurality of application or for each of a plurality of services included in the electronic device 101, and the information may be set during a process of setting security with respect to each of the plurality of applications or each of the plurality of services.

The information may be set using information associated with rotation that is based on the rotation of the body of rotation. The information may be set using information associated with the number of inputs through the body of rotation, a rotation direction, the number of rotations, and a rotation angle, based on the security level set for the application or the service. A detailed method of setting the information will be described later.

The information may include authentication related information used for authenticating a user, or authentication related information associated with an external electronic device, for example. For example, the information may include security information, such as a password, for authenticating a user, and may include security information used for authenticating an external electronic device. Hereinafter, descriptions will be provided by assuming the information as security information, such as a password, but the present disclosure is not limited thereto. For example, the information may be stored in the memory 130 for each of a plurality of applications or for each of a plurality of services.

Figure 2:
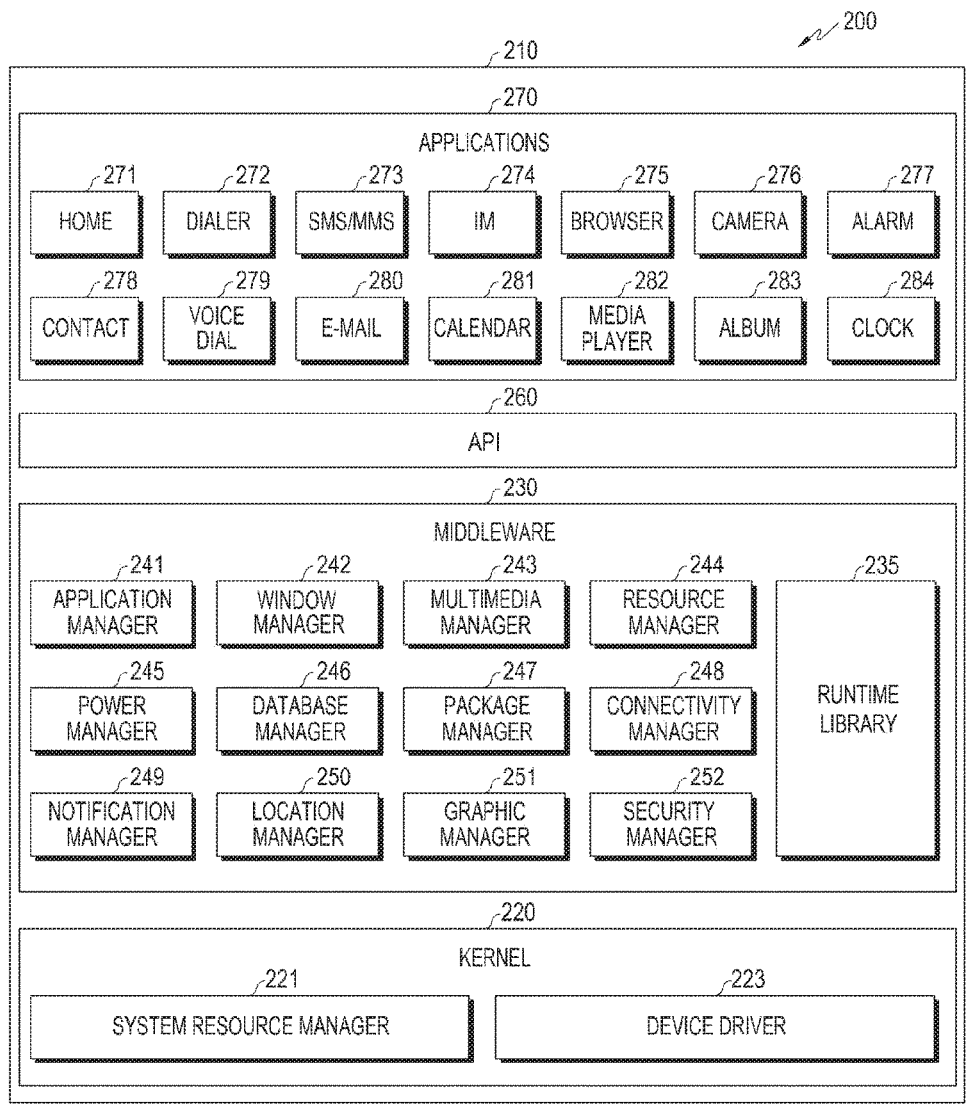
FIG. 2 is a block diagram of a program module according to embodiments of the present disclosure.

FIG. 2 is a block diagram of a program module according to embodiments of the present disclosure. According to an embodiment of the present disclosure, a program module 210, such as the program 140) may include an operating system (OS) for controlling resources related to an electronic device, such as the electronic device 101) and/or various applications, such as the application programs 147) executed in the operating system. The operating system may be, for example, Android, iOS, Windows, Symbian, Tizen, Bada, or the like.

The program module 210 may include a kernel 220, middleware 230, an application programming interface (API) 260, and/or applications 270. At least some of the program module 210 may be preloaded on an electronic device, or may be downloaded from an external electronic device, such as the electronic device 102 or 104, or the server 106.

The kernel 220 may include, for example, a system resource manager 221 and/or a device driver 223. The system resource manager 221 performs the control, allocation, retrieval, or the like of system resources. According to an embodiment of the present disclosure, the system resource manager 221 may include a process manager, a memory manager, a file system manager, or the like. The device driver 223 may include, for example, a display driver, a camera driver, a Bluetooth™ driver, a shared memory driver, a universal serial bus (USB) driver, a keypad driver, a Wi-Fi driver, an audio driver, or an inter-process communication (IPC) driver.

The middleware 230 provides a function required by the applications 270 in common or provide various functions to the applications 270 through the API 260 so that the applications 270 may efficiently use limited system resources within the electronic device. According to an embodiment of the present disclosure, the middleware 230 may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module, which a compiler uses in order to add a new function through a programming language while the applications 270 are being executed. The runtime library 235 performs input/output management, memory management, the functionality for an arithmetic function, or the like.

The application manager 241 manages the life cycle of at least one of the applications 270. The window manager 242 may manage graphical user interface (GUI) resources used for a screen. The multimedia manager 243 determines a format required to reproduce various media files, and may encode or decode a media file by using a coder/decoder (codec) appropriate for the corresponding format. The resource manager 244 manages resources such as a source code, a memory, and a storage space of at least one of the applications 270.

The power manager 245 may, for example, operate together with a basic input/output system (BIOS) to manage a battery or power, and provides power information required for the operation of the electronic device. The database manager 246 generates, searches for, or changes a database to be used by at least one of the applications 270. The package manager 247 manages the installation or updating of an application distributed in the form of a package file.

The connectivity manager 248 manages a wireless connection, such as Wi-Fi or Bluetooth™. The notification manager 249 displays or notifies of an event, such as an arrival message, an appointment, or a proximity notification, in such a manner as not to disturb the user. The location manager 250 manages location information of the electronic device. The graphic manager 251 manages a graphic effect, which is to be provided to the user or a user interface related to the graphic effect. The security manager 252 provides various security functions required for system security and user authentication. According to an embodiment of the present disclosure, when the electronic device 101 has a telephone call function, the middleware 230 may further include a telephony manager for managing a voice call function or a video call function of the electronic device.

The middleware 230 may include a middleware module that forms a combination of various functions of the above-described components. The middleware 230 provides a module specialized for each type of OS in order to provide a differentiated function. The middleware 230 may dynamically delete some of the existing components, or may add new components.

The API 260 is a set of API programming functions, and may be provided with a different configuration according to an OS. For example, in the case of Android or iOS, one API set may be provided for each platform. In the case of Tizen, two or more API sets may be provided for each platform.

The applications 270 may include, for example, one or more applications that can provide functions, such as home 271, dialer 272, short message service/multimedia messaging service (SMS/MMS) 273, instant message (IM) 274, browser 275, camera 276, alarm 277, contacts 278, voice dial 279, email 280, calendar 281, media player 282, album 283, clock 284, health care, such as measuring exercise quantity or blood sugar, or environment information, such as atmospheric pressure, humidity, or temperature information.

According to an embodiment of the present disclosure, the applications 270 may include an information exchanging application that supports exchanging information between an electronic device 101 and an external electronic device 102 or 104. The information exchanging application may include, for example, a notification relay application for transferring predetermined information to an external electronic device or a device management application for managing an external electronic device.

For example, the notification relay application may include a function of transferring, to the external electronic device 102 or 104, notification information generated from other applications of the electronic device. For example, the notification relay application receives notification information from an external electronic device, and provides the received notification information to a user.

The device management application installs, deletes, or updates, for example, at least one function of an external electronic device 102 or 104 communicating with the electronic device, such as turning on/off the external electronic device itself (or some components) or a function of adjusting luminance or a resolution of the display, applications operating in the external electronic device, or services provided by the external electronic device, such as a call service and a message service.

According to an embodiment of the present disclosure the applications 270 may include a health care application of a mobile medical appliance designated according to attributes of the external electronic device 102 or 104. The applications 270 may be received from the external electronic device. The applications 270 may include a preloaded application or a third party application that can be downloaded from the server. Names of the components of the program module 210 vary depending on the type of OS.

At least some of the program module 210 may be embodied as software, firmware, hardware, or a combination of two or more thereof. At least some of the program module 210 may be implemented by, for example, the processor 210, and may include a module, a program, a routine, a set of instructions, or a process for performing one or more functions.

Figure 3:
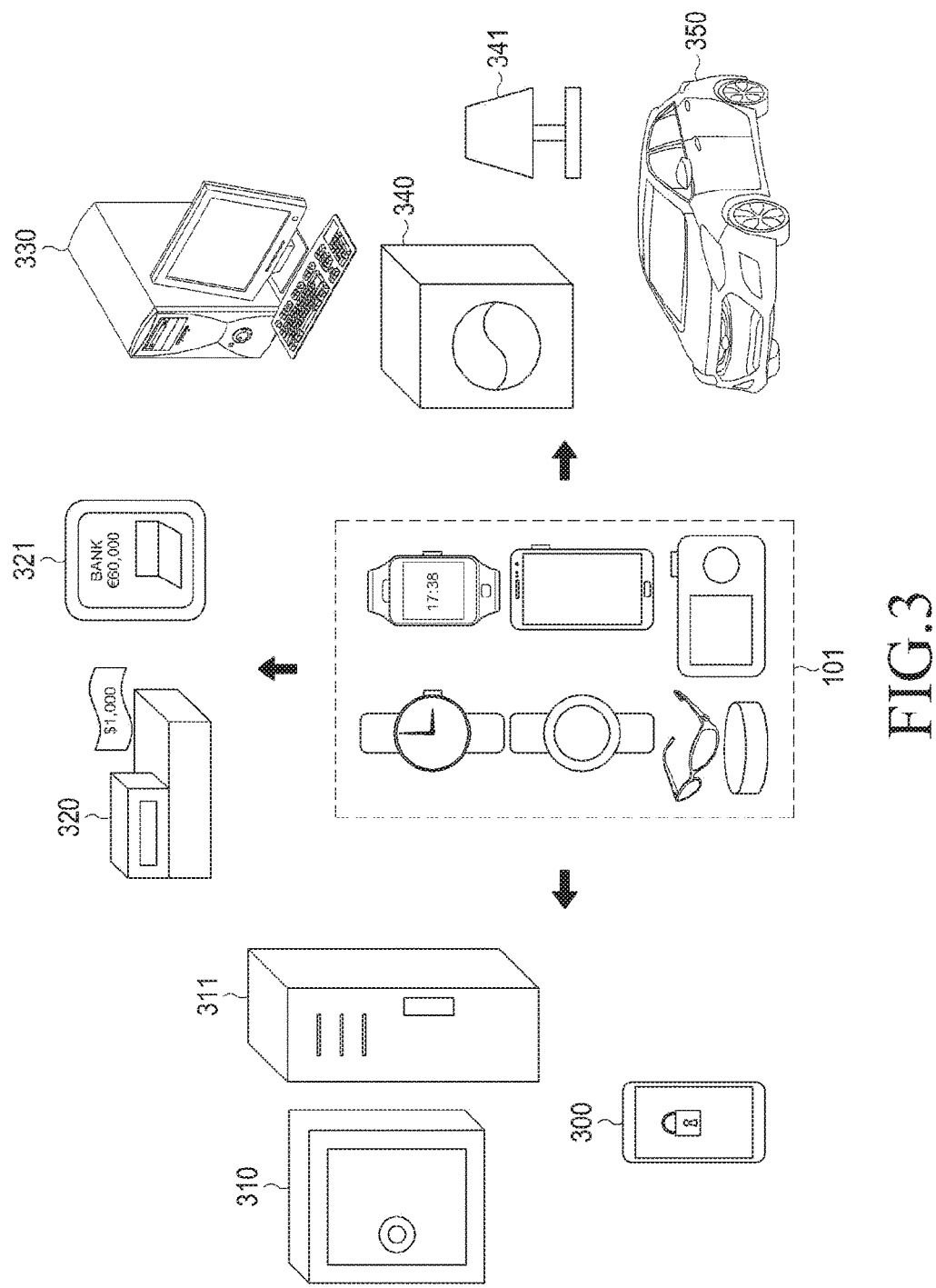
FIG. 3 illustrates various devices that are capable of using security information input through an electronic device according to embodiments of the present disclosure.

FIG. 3 illustrates various devices that are capable of using security information input through an electronic device according to embodiments of the present disclosure.

According to embodiments of the present disclosure, an external electronic device may request the electronic device 101 to input additional security information for security. The electronic device 101 transmits, to the external device by request from external devices, security information input through the body of rotation included in the electronic device 101.

The electronic device 101 may be one of the various electronic devices that include a body of rotation. For example, the electronic device 101 may be a wearable electronic device, an analog watch, a digital watch, a camera, or the like, and each electronic device may include a body of rotation. An existing component of each electronic device may be used as a body of rotation, or a separate component may be added and used as a body of rotation. For example, a bezel or the stem of a watch may be used as a body of rotation for a smart watch, an analog watch, and a digital watch. An existing rotary button of a camera may be used as a body of rotation, or a separate component may be added and used as a body of rotation.

The wearable electronic device may include a smart watch, a smart band, a smart necklace, smart earrings, earphones, a headset, a smart ring, and smart glasses. The smart watch and the smart band may be distinguished based on whether a display is included. When a display is included, it is distinguished as the smart watch. The smart band does not include a display and may be used by interworking with a device including a display.

The analog watch and the digital watch may include an electronic communication function. Accordingly, an input through the body of rotation may be transmitted to another external electronic device.

Hereinafter, a method for an external electronic device to use security information input through a body of rotation of the electronic device 101 will be described through embodiments. For example, the electronic device 101 determines whether to cancel a password and a screen saver based on security information input through the body of rotation. The electronic device 101 transmits the security information to an external electronic device, cancels the security of the external electronic device, and controls the external electronic device by interworking with the external electronic device.

The external electronic device compares security information received from the electronic device 101 with stored security information, or decrypts an encrypted code included in the security information, and executes an application or a service that requires security information when the decrypted code is available. The external electronic device may be controlled by an input through the body of rotation of the electronic device 101. For example, external electronic devices may also determine whether to cancel a password and a screen saver based on the security information received from the electronic device 101.

According to an embodiment of the present disclosure, a lock screen of the smart phone 300 may be unlocked by an input through the body of rotation of the electronic device 101. A user may input, through the body of rotation of the electronic device 101, security information for unlocking a lock screen set for the smart phone 300, and the electronic device 101 transmits, to the smart phone 300, the security information input through the body of rotation. The smart phone 300 may unlock the lock screen through the received security information. In addition, when the smart phone 300 requires security information to execute an application or a service, the security information for executing the application or the service may be input through the body of rotation of the electronic device 100 and the application or the service may be executed in the smart phone 300.

According to an embodiment of the present disclosure, the locking state of the safe 310 and the locker 311 may be unlocked by an input through the body of rotation of the electronic device 101. The safe 310 and the locker 311 may include a communication function and a processor, or the like, that determines whether to unlock the locking state based on whether security information is input. The user may input security information, such as a password set for the safe 310 and locker 311, through the body of rotation of the electronic device 101. The electronic device 101 transmits the input security information to the safe 310 and the locker 311, and the processor included in the safe 310 and the locker 311 determines whether to unlock the locking state based on the security information.

According to an embodiment of the present disclosure, the user may pay for a product using the electronic device 101 when purchasing the product. For example, the electronic device 101 communicates with a terminal 320, so as to transfer the payment of the product from the account of a user. To this end, the user executes an application or a service so as to transfer the payment of the product from the account of the user. The user may input security information required to execute the application or the service through the body of rotation of the electronic device 101. As described above, the user may make payments of, or pay for, a product through the electronic device 101 instead of by cash and cards used for direct transactions and credit transactions when the user purchases a product, uses transportation, and utilizes a service such as beauty treatment.

When the user uses Internet financial service using the electronic device 101 or another electronic device 321, such as a smart phone, a PC, a tablet PC, or a notebook, the security information used for the Internet financial service may be input through the body of rotation of the electronic device 101. When the user uses the Internet financial service through the other electronic device 321, the user may input the security information requested by the Internet financial service through the electronic device 101. As described above, the user may input various security information required to execute an application or a service through the body of rotation of the electronic device 101.

According to an embodiment of the present disclosure, the user may access an external electronic device, such as the PC 330, the stereo 340, the electric light 341, or the vehicle 350, and controls the external electronic devices. For example, the user may input security information required by an external electronic device, such as a password or the like, through the body of rotation of the electronic device 101, and controls the execution or cancellation of a predetermined function of the external electronic device through the body of rotation. As described above, the user controls, through the electronic device 101, various electronic devices including an IoT function.

Figure 4:
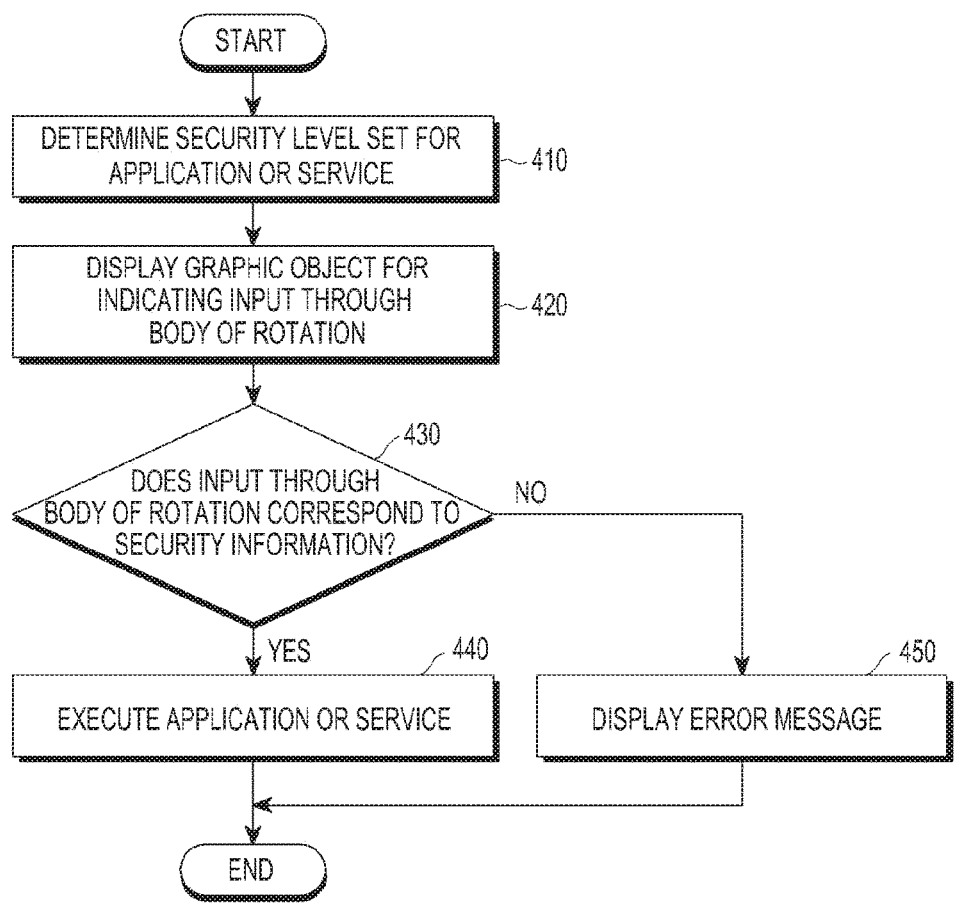
FIG. 4 illustrates a method for an electronic device to execute an application or a service of the application according to embodiments of the present disclosure.

FIG. 4 illustrates a method for an electronic device to execute an application or a service of the application according to embodiments of the present disclosure.

In step 410, the electronic device 101 determines a security level set for an application or a service of which execution is requested. The processor 120 determines the security level set for the application or the service in response to an input from a user or a request from another electronic device for executing the application or the service.

In step 420, the electronic device 101 displays, in the display 160, a graphic object for indicating an input through the body of rotation based on the determined security level. The graphic object is for indicating an input through the body of rotation, and may be expressed to be similar to the shape of a display or the shape of the body of rotation.

According to an embodiment of the present disclosure, when a user input for using the electronic device 101 is received in the locking state, the electronic device 101 displays a graphic object based on a predetermined security level. As described above, the graphic object may be displayed based on a predetermined security level so as to unlock the locking state as well as to execute an application or a service of the application, and the input through the body of rotation may also be used for unlocking the locking state.

According to embodiments of the present disclosure, at least one of the number of inputs through the body of rotation, whether to determine a rotation direction, and a rotation angle may be determined based on the security level. As the security level increases, the number of times that inputting is performed through the body of rotation may be set to increase security by increasing the number of inputs through the body of rotation.

In step 430, the electronic device 101 determines whether the input through the body of rotation corresponds to information set for the application or the service of which execution is requested.

In step 440, when the input through the body of rotation corresponds to information set for the application or the service of which execution is requested, the electronic device 101 executes the application or the service. When the input through the body of rotation corresponds to the set information, the electronic device 101 transmits, to another electronic device in the outside, information indicating that the input through the body of rotation corresponds to the set security information.

When the input through the body of rotation corresponds to the set information, the electronic device 101 outputs sound or vibration or displays a message so as to inform the user that the input through the body of rotation corresponds to the set information. When inputting through the body of rotation needs to be performed four times, sound or vibration may be output or a message may be displayed every time each input corresponds to set information, or sound or vibration may be output or a message may be displayed only when all of the four inputs through the body of rotation correspond to the set information.

In step 450, when the input through the body of rotation does not correspond to the information set for the application or the service of which execution is requested, the electronic device 101 displays, in a display 160, an error message indicating that the input through the body of rotation does not correspond to the set information. The electronic device 101 displays a message that requests re-inputting the information set for the application or the service, or may terminate an execution procedure of the application or the service.

FIGS. 5A, 5B, 5C, and 5D illustrate a graphic object that indicates an input through a body of rotation, which is displayed through an electronic device, according to embodiments of the present disclosure.

Figure 5A:
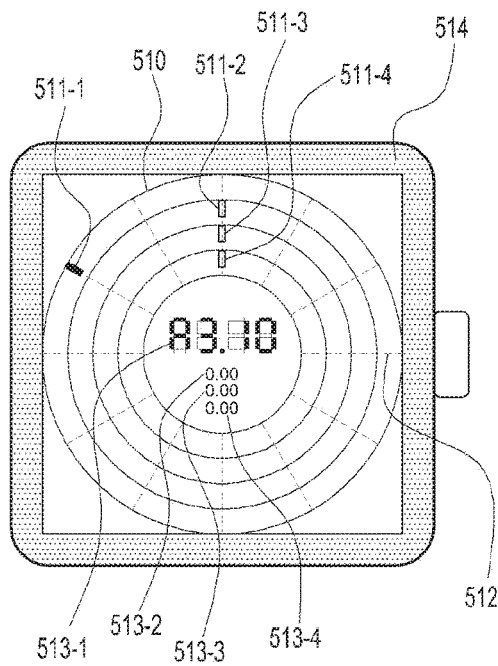
FIGS. 5A, 5B, 5C and 5D illustrate a graphic object that indicates an input through a body of rotation, which is displayed through an electronic device, according to embodiments of the present disclosure.
Figure 5B:
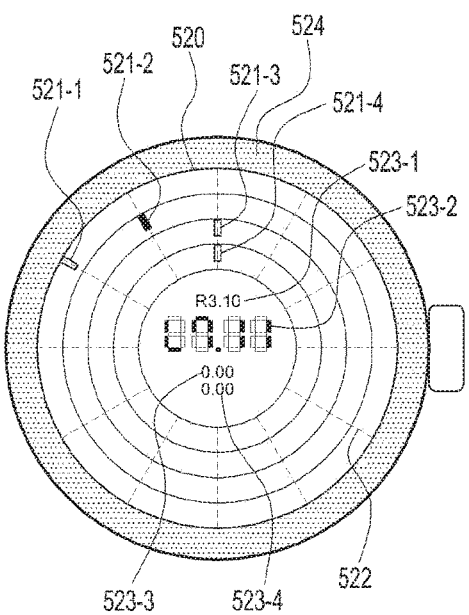
Figure 5C:
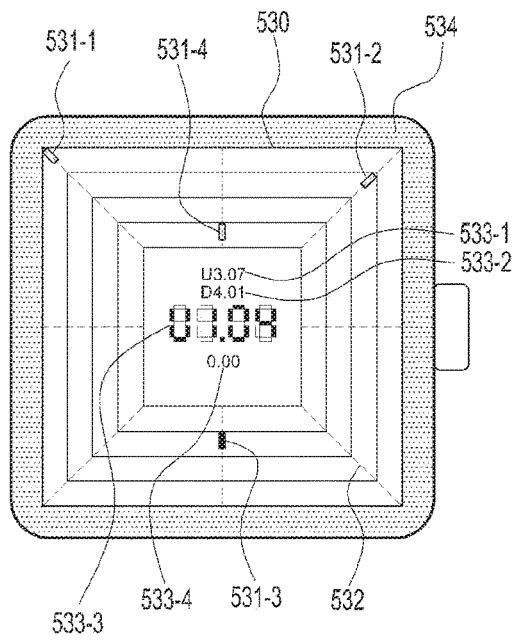
Figure 5D:
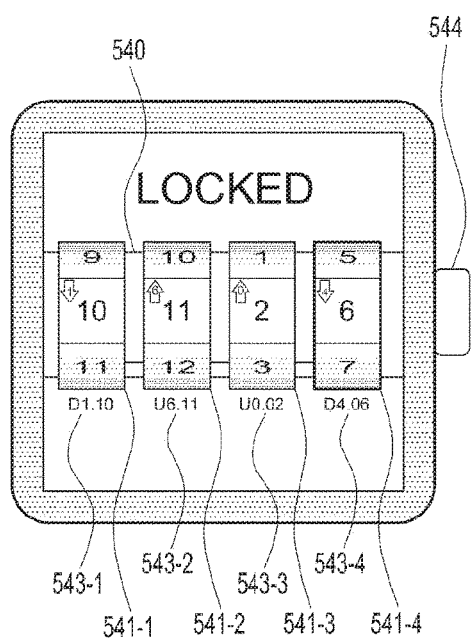

As illustrated in FIGS. 5A, 5B, 5C, and 5D, a graphic object 510, 520, 530, and 540 that indicates an input through a body of rotation may be displayed in the display of the electronic device 101. The graphic object 510 may be displayed in a shape different from the shape of a bezel 514, as illustrated in FIG. 5A. As illustrated in FIG. 5A, although the bezel 514 is in a quadrangular shape, the object 510 may be displayed in a circular shape. As illustrated in FIGS. 5B and 5C, the graphic object 520 and 530 may be displayed in a shape that is identical to the shape of a bezel 524 and 534. As illustrated in FIG. 5D, when the body of rotation is a stem 544, the graphic object 540 may be displayed so that an input through the body of rotation is recognized intuitively.

According to an embodiment of the present disclosure, the graphic object 510 and 520 may be displayed in the form of a circular dial, as illustrated in FIGS. 5A and 5B. However, this is merely an example for illustrative purposes, and the graphic object 530 may be displayed in a quadrangular shape as illustrated in FIG. 5C, or in another shape that is different from a dial as illustrated in FIG. 5D. As described above, a graphic object may be displayed in various manners for indicating an input through the body of rotation based on a user's setting or the like.

When an input through the body of rotation is obtained as the body of rotation rotates, the graphic object 510, 520, 530, and 540 is changed in real time and displays the input through the body of rotation. For example, as illustrated in FIGS. 5A, 5B, and 5C, an indicator 511, 521, and 531 which indicates an input through the body of rotation may be displayed in the graphic object 510, 520, and 530 to be rotated equally when the body of rotation is rotated so as to reflect the rotation of the body of rotation. As illustrated in FIG. 5D, a number and an arrow indicating information associated with an input through the body of rotation may be displayed in an indicator 541.

According to embodiments of the present disclosure, the graphic object may be displayed to be different based on a security level. The number of inputs through the body of rotation may be determined based on a security level. For example, as the security level increases, the number of inputs through the body of rotation increases, and thus, the graphic object may be displayed to indicate the number of inputs through the body of rotation, which corresponds to the determined security level. As the security level decreases, the number of inputs through the body of rotation decreases, and thus, the graphic object may be displayed to indicate the number of inputs through the body of rotation, which corresponds to the determined security level.

Hereinafter, it is assumed that inputting through the body of rotation needs to be performed a total of four times based on a security level. Accordingly, as described in FIGS. 5A, 5B, 5C and 5D, the graphic objects 510, 520, 530, and 540 and text 513, 523, 533, and 543 for displaying a total of four inputs may be displayed in the display. As illustrated in FIGS. 5A and 5B, the graphic objects 510 and 520 are displayed as four circular rings, and text 513 and 523 for displaying an input through the body of rotation may be displayed in the center of the display. As illustrated in FIG. 5C, the graphic object 530 is displayed as four quadrangular rings, and in the same manner, the text 533 for displaying an input through the body of rotation may be displayed in the center of the display. As illustrated in FIG. 5D, the graphic object 540 is displayed in the form in which rings are coiled around a cylinder, so as to indicate an input through the stem 544, which is one of the body of rotation, and each ring may be an indicator 541-1, 541-2, 541-3, and 541-4 to indicate an input of the body of rotation. A number and an arrow that indicate information associated with each input through the body of rotation may be displayed in each indicator 541-1, 541-2, 541-3, and 541-4, and text 543 for displaying an input through the body of rotation may be displayed in the bottom of each indicator 541-1, 541-2, 541-3, and 541-4.

As illustrated in FIGS. 5A, 5B, and 5C, a reference line 512, 522, and 532 is displayed in each graphic object 510, 520, and 530 based on a predetermined angle recognition level so that a user readily recognizes the rotation angle of the body of rotation. As illustrated in FIG. 5D, a unit of the body of rotation, which is set based on an angle recognition level, may be displayed as a number in the indicator 541.

The angle recognition level is associated with how many sections a single rotation is divided into when an angle is recognized. When the angle recognition level is 12, an angle may be recognized by dividing a single rotation into 12 sections. A rotation angle of 30 degrees of the body of rotation may be recognized as 1 unit.

The angle recognition level may be set by a user, or may be set to be different for each security level. For example, in the same manner as the number of inputs through the body of rotation, the angle recognition level increases as the security level increases. Accordingly, the recognized rotation angle of the body of rotation decreases. As the security level decreases, the angle recognition level decreases. Accordingly, the recognized rotation angle of the body of rotation increases. As described above, the angle recognition level may be set adaptively based on a security level.

As illustrated in FIGS. 5A and 5B, a reference line 512 and 522 may be displayed in the graphic object 510 and 520 so as to indicate a unit set based on an angle recognition level. When the angle recognition level is set to 12, the electronic device 101 recognizes the angle of the body of rotation using 30 degrees as 1 unit, and accordingly, displays a reference line 512 and 522 for every 30 degrees. As illustrated in FIG. 5C, when the angle recognition level is set to 8, the electronic device 101 recognizes the angle of the body of rotation using 45 degrees as 1 unit, and accordingly, displays a reference line 532 for every 45 degrees. As illustrated in FIG. 5D, a unit that is set based on an angle recognition level may be displayed as a number in the indicator 541.

An indicator 511, 521, and 531 corresponding to an input through the body of rotation may be displayed in each graphic object 510, 520, 530, and 540. For example, as illustrated in FIG. 5A, an indicator 511-1 that corresponds to a first input through the body of rotation out of the four inputs through the body of rotation may be displayed in the outermost ring.

As illustrated in FIG. 5B, a first indicator 521-1 corresponding to a first input through the body of rotation is displayed in the outermost ring, and a second indicator 521-2 corresponding to a second input through the body of rotation is displayed in a second ring.

Indicators 521-3 and 521-4 corresponding to third and fourth inputs through the body of rotation, which are not yet input, out of the four inputs through the body of rotation may be displayed in predetermined points of respectively corresponding rings. An indicator corresponding to an input currently provided through the body of rotation may be displayed to be distinguished from other indicators by being highlighted or expressed by a different color, or the like.

As illustrated in FIG. 5D, information indicating an input through the body of rotation may be displayed as a number in each indicator 541-1, 541-2, 541-3, and 541-4, and a rotation direction may be displayed as an arrow in each indicator 541-1, 541-2, 541-3, and 541-4. The number indicating the number of rotations of the body of rotation may be displayed inside or outside the arrow. For example, an indicator 541-1 indicating a first input conveys that the first input corresponds to a rotation executed downward once by 10 units. An indicator 541-2 indicating a second input conveys that the second input corresponds to rotations executed upward six times and rotates the body of rotation by 11 units. When an input currently provided through the body of rotation is a fourth input, the border of an indicator 541-4 indicating the fourth input may be displayed to be highlighted or in a different color when compared to the borders of other indicators 541-1, 541-2, and 541-3.

The electronic device 101 displays an input through the body of rotation as text 513, 523, 533, and 543, such as numbers, characters, or symbols. When a total of four inputs through the body of rotation are required based on a security level, information displayed as text 513, 523, 533, and 543 displays all of the information associated with the total of four inputs through the body of rotation.

When the information is displayed as the text 513-1, 523-2 533-3, and 543-4, information that is currently input through the body of rotation may be displayed larger or highlighted when compared to information of which inputting is completed or information that is not yet input. Through the above, a user may efficiently recognize the currently input information. An input through the body of rotation, which is not yet input, may be displayed as a predetermined value, such as "0.00" 513-2, 513-3, and 513-4, as illustrated in FIG. 5A, 523-3, 523-4, as illustrated in FIG. 5B and 533-4, as illustrated in FIG. 5C or may not be displayed. Information of which inputting is completed may also not be displayed.

According to embodiments of the present disclosure, the input through the body of rotation may include information associated with the rotation direction of the body of rotation, the number of rotations of the body of rotation, and the rotation angle of the body of rotation. Each piece of information may be displayed through the text. According to FIG. 5A, text 513-1, "R3.10", is displayed, in association with an input that is currently input through the body of rotation. R indicates the rotation direction of the body of rotation, 3 indicates the number of rotations of the body of rotation, and 10 indicates the rotation angle of the body of rotation. The rotation angle may be displayed as a number based on a predetermined angle recognition level as illustrated in FIG. 5A, or may be displayed as an actual rotation angle. Therefore, "R3.10" indicates that the body of rotation currently rotates rightward three times, and the rotation angle of the body of rotation is 300 degrees.

The electronic device 101 changes a graphic object as the number of rotations of the body of rotation changes, and displays the same. For example, as the number of rotations of the body of rotation changes, the electronic device 101 changes the color of a circular ring corresponding to the current input through the body of rotation. Particularly, the electronic device 101 changes the color of a circular ring to red when the number of rotations is 1, to orange when the number of rotations is 2, and to yellow when the number of rotations is 3. As described above, the electronic device 101 changes the color of a circular ring corresponding to an input through the body of rotation as the number of rotations changes, and displays the same, so that a user may intuitively recognize the number of rotations through the body of rotation.

According to FIG. 5B, text 523-2, "L7.11", is displayed, in association with an input that is currently input through the body of rotation. "L7.11" indicates that the body of rotation rotates 7 times leftward, and the rotation angle of the body of rotation is 330 degrees. And text 523-1, "R3.10", is inputted through the body of rotation before the input corresponding to the text 523-2 is inputted.

In the same manner, as illustrated in FIG. 5C, text 533-3, "U1.04", is displayed, in association with an input that is currently input through the body of rotation. "U1.04" indicates that the body of rotation rotates once upward, and the rotation angle of the body of rotation is 180 degrees. When text, "D1.04" is displayed in association with an input that is currently input through the body of rotation, "D1.04" indicates that the body of rotation rotates downward once and the rotation angle of the body of rotation is 180 degrees. And text 533-1, "U3.07" and text 533-2, "D4.01", are inputted through the body of rotation before the input corresponding to the text 533-3 is inputted.

As illustrated in FIG. 5D, text 543-4, "D4.06", is displayed in association with an input that is currently input through the body of rotation. "D4.06" indicates that the body of rotation rotates 4 times downward, and the rotation angle of the body of rotation is 6 units. In FIG. 5D, the rotation angle of the body of rotation may be displayed based on a unit, unlike FIGS. 5A, 5B, and 5C. And text 543-1, "D1.10", text 543-2, "U6.11", and text 543-3, "U0.02" are inputted through the body of rotation before the input corresponding to the text 543-4 is inputted.

The electronic device 101 displays the rotation direction of the body of rotation as "up" or "down", as opposed to "right" or "left", based on the characteristic of the body of rotation, so that a user may intuitively recognize the rotation direction of the body of rotation. When the body of rotation is a stem, the electronic device 101 displays the rotation direction as "up" or "down", as opposed to "right" or "left".

When the electronic device 101 includes a plurality of body of rotations, the rotation direction of each body of rotation may be set to correspond to one another. When a first body of rotation is a bezel and a second body of rotation is a stem, the rotation of the first body of rotation executed rightward is set to correspond to the rotation of the second body of rotation executed upward, and the rotation of the first body of rotation executed leftward is set to correspond to the rotation of the second body of rotation executed downward. Through the above, an input that is set to correspond to the second body of rotation may be executed using the first body of rotation. An input that is set to correspond to the first body of rotation may be executed using the second body of rotation. As described above, the first body of rotation and the second body of rotation may be set to be mutually compatible.

FIGS. 6A, 6B, 6C and 6D illustrate a method of adjusting an input through a body of rotation through a touch screen according to embodiments of the present disclosure.

FIGS. 6A, 6B, 6C and 6D relate to a method of quickly inputting rotations corresponding to the number of rotations, which are included in an input, is provided through a body of rotation.

When the number of rotations through the body of rotation is set to be large, a user needs to rotate, one by one, the body of rotation as many times as a predetermined number of rotations, which may cause an inconvenience for the user. Therefore, the number of rotations of the body of rotation may be adjusted using another input means included in the electronic device 101. Hereinafter, although descriptions will be provided from the perspective of the number of rotations of the body of rotation from among information included in the input through the body of rotation, other information, such as the rotation direction of the body of rotation and the rotation angle of the body of rotation, may also be adjusted by another input means included in the electronic device 101.

FIG. 6A relates to a method of adjusting the number of rotations using the rotation speed of the body of rotation. When the rotation speed of the body of rotation is greater than, or equal to, a predetermined rotation speed, the number of rotations of the body of rotation is increased although the body of rotation does not rotate once. When the rotation speed of the body of rotation is greater than, or equal to, a predetermined rotation speed, the number of rotations of the body of rotation is increased although the body of rotation makes only ½ rotation.

By subdividing the predetermined rotation speed, when the rotation speed of the body of rotation is greater than a first predetermined speed, the number of rotations of the body of rotation is increased although the body of rotation makes only ½ rotation. When the rotation speed is greater than, or equal to, a second predetermined speed that is greater than the first predetermined speed, the number of rotations of the body of rotation is increased although the body of rotation makes only ¼ rotation. As described above, the number of rotations of the body of rotation may be adjusted using the rotation speed of the body of rotation.

Accordingly, when the rotation speed of the body of rotation that is rotated by a user is greater than, or equal to, a predetermined speed as described in diagram (a) of FIG. 6A, the number of rotations of the body of rotation is increased by 1 as described in diagram (b) of FIG. 6A. Through the above, the user may quickly adjust the number of rotations of the body of rotation.

Figure 6B:
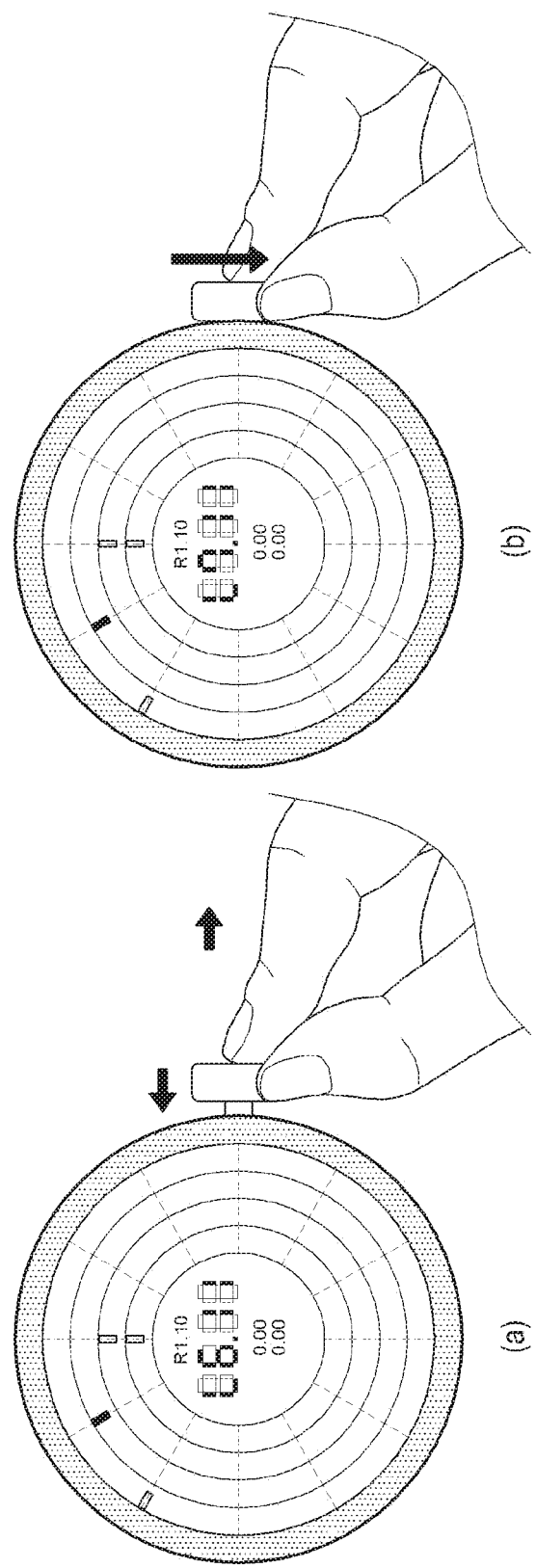

When the body of rotation is the stem of a watch, and the user rotates the body of rotation by pressing or pulling the body of rotation, FIG. 6B describes a method in which the electronic device 101 recognizes the situation as a state of changing the number of rotations of the body of rotation, and changes the number of rotations. For example, it is assumed that the electronic device 101 is set to recognize the situation as a state of changing the number of rotations when the body of rotation is rotated by pressing or pulling the stem. It is assumed that the electronic device 101 is set to recognize the situation as a state of changing a rotation angle when the body of rotation is rotated without pressing or pulling the stem.

In this instance, when the user rotates the body of rotation upward by pressing or pulling the stem, so as to quickly change the number of rotations of the body of rotation, the electronic device 101 increases the number of rotations of the body of rotation. Conversely, when the user rotates the body of rotation downward by pressing or pulling the stem, the electronic device 101 decreases the number of rotations of the body of rotation.

Subsequently, when the user rotates the body of rotation without pressing or pulling the stem, the electronic device 101 recognizes the situation as the state of changing a rotation angle, as opposed to the state of changing the number of rotations, and thus, changes the rotation angle of the body of rotation.

The method of changing the number of rotations may be different for each characteristic of the stem. When the stem is capable of maintaining the state of being pressed or pulled, the user may press or pull the stem, and subsequently, rotates the stem so as to change the number of rotations of the body of rotation. Conversely, when the stem is incapable of maintaining the state of being pressed or pulled, the user may rotate the stem by pressing and pulling the stem, so as to change the number of rotations of the body of rotation.

Accordingly, when the user rotates the body of rotation by pressing or pulling the stem as illustrated in diagram (a) of FIG. 6B, the number of rotations of the body of rotation is increased by 1 as illustrated in diagram (b) of FIG. 6B. Through the above, the user may quickly adjust the number of rotations of the body of rotation.

Figure 6C:
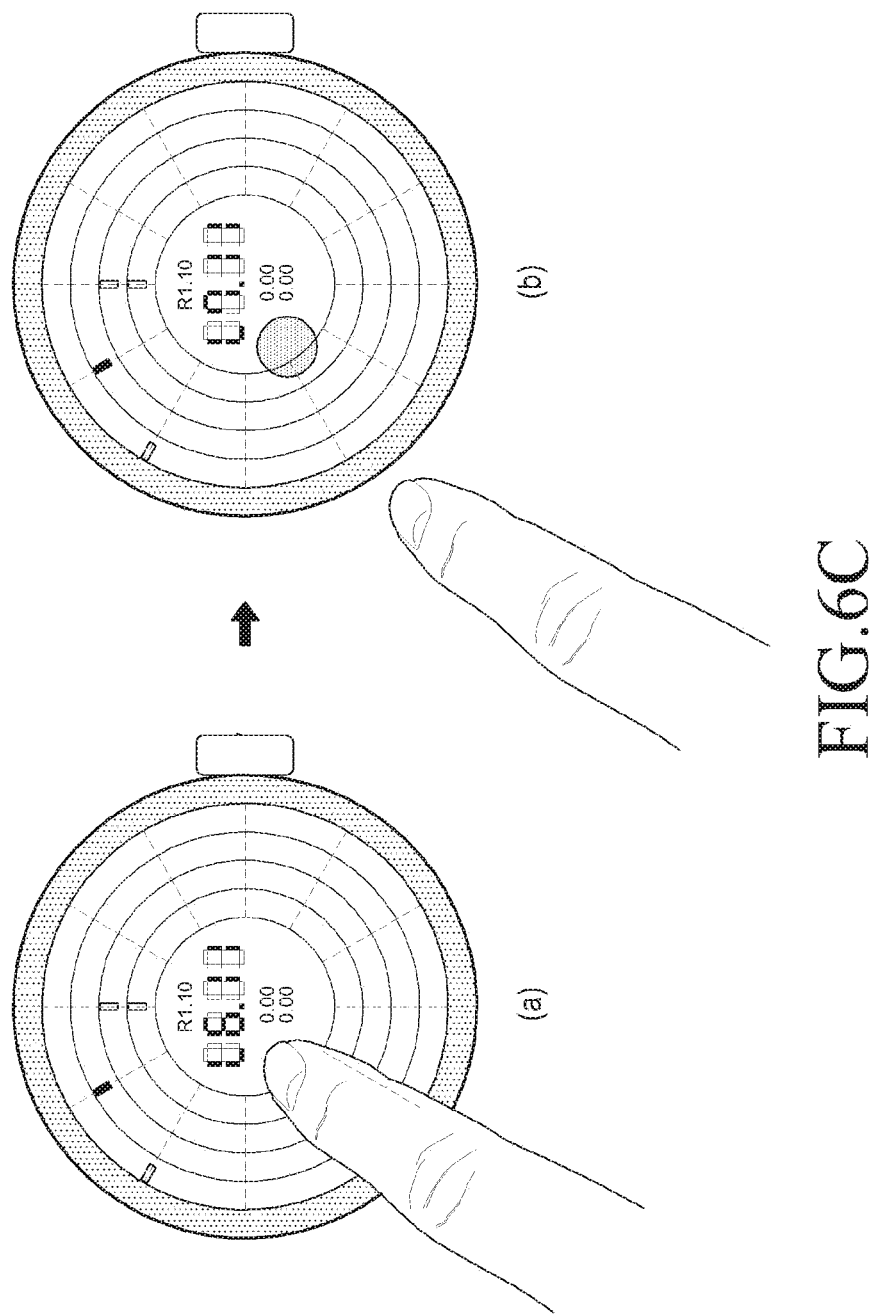
Figure 6D:
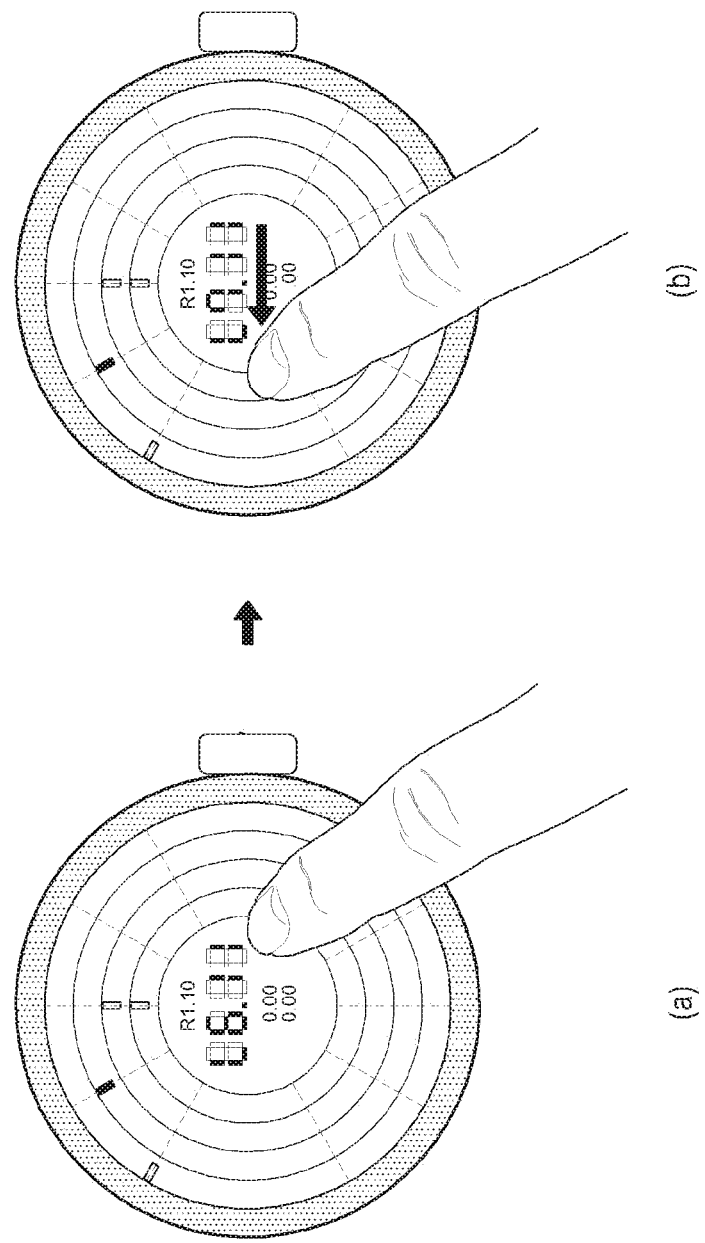

FIGS. 6C and 6D illustrate a method of adjusting the number of rotations of the body of rotation through a touch input that is input through a touch screen of the electronic device 101. As illustrated in FIG. 6C, the number of rotations of the body of rotation may be adjusted through a touch input when a graphic object is displayed. When the user touches the left area based on the center of the touch screen where the graphic object is displayed, the number of leftward rotations is increased by 1, and the number of rightward rotations is decreased by 1. When the user touches the right area, the number of rightward rotations is increased by 1, and the number of leftward rotations is decreased by 1.

Accordingly, when the user touches the left area of the touch screen as illustrated in diagram (a) of FIG. 6C, the number of rotations of the body of rotation rotating leftward is increased by 1 as illustrated in diagram (b) of FIG. 6C. Through the above, the user may quickly adjust the number of rotations of the body of rotation.

As illustrated in FIG. 6D, the number of rotations of the body of rotation may be adjusted through dragging a touch input when a graphic object is displayed. When the user drags a touch leftward by touching a touch screen, the number of rotations of the body of rotation rotating leftward is increased by 1 and the number of rightward rotations of the body of rotation is decreased by 1. When the user drags a touch rightward by touching a touch screen, the number of rotations of the body of rotation rotating rightward is increased by 1 and the number of leftward rotations of the body of rotation is decreased by 1.

Accordingly, when the user drags a touch leftward by touching a touch screen as illustrated in diagram (a) of FIG. 6D, the number of rotations of the body of rotation rotating leftward is increased by 1 as illustrated in diagram (b) of FIG. 6D. Through the above, the user may quickly adjust the number of rotations of the body of rotation.

When the body of rotation has a function of moving to the left and to the right, or up and down, in addition to a function of rotating, the body of rotation may adjust the number of rotations of the body of rotation by moving the body of rotation to the left, to the right, up, or down. When the body of rotation is capable of moving to the left or to the right, and the recognition of the movement of the body of rotation to the left or to the right is possible, the number of rotations of the body of rotation may be adjusted through the movement of the body of rotation to the left or to the right. When the user moves the body of rotation to the left, the number of leftward rotations is increased by 1, and the number of rightward rotations is decreased by 1. Conversely, when the user moves the body of rotation to the right, the number of rightward rotations is increased by 1, and the number of leftward rotations is decreased by 1.

The number of rotations may be adjusted based on a pressure applied to the body of rotation. When the pressure applied to the body of rotation is greater than a first predetermined threshold value, the number of rotations of the body of rotation is increased by 1, and when the pressure applied to the body of rotation is less than a second predetermined threshold value, the number of rotations of the body of rotation is decreased by 1. In addition, the number of rotations may be adjusted based on a pressure applied to a display. The pressure applied to the display may be sensed through a force sensor included in the electronic device 101. When the pressure applied to the display is greater than a first predetermined threshold value, the number of rotations of the body of rotation is increased by 1, and when the pressure applied to the display is less than a second predetermined threshold value, the number of rotations of the body of rotation is decreased by 1. The level of adjusting the number of rotations based on a pressure applied to the body of rotation or the display may also be subdivided by subdividing a threshold value.

When the user moves the body of rotation in one direction and maintains the state during a predetermined period of time, the number of rotations is continuously increased by 1 in the rotation direction corresponding to the movement, and the number of rotations that increases until the movement of the rotations stops may be recognized as the number of rotations of the body of rotation. The movement of the body of rotation made upward or downward may be used in the same manner as the above described movement to the left or to the right.

As described above, when the number of rotations to be input is high, the number of rotations of the body of rotation may be adjusted through various input means included in the electronic device 101. Through the above, the user may conveniently and quickly input rotations by adjusting the number of rotations of the body of rotation, instead of rotating the body of rotation one by one.

Figure 7:
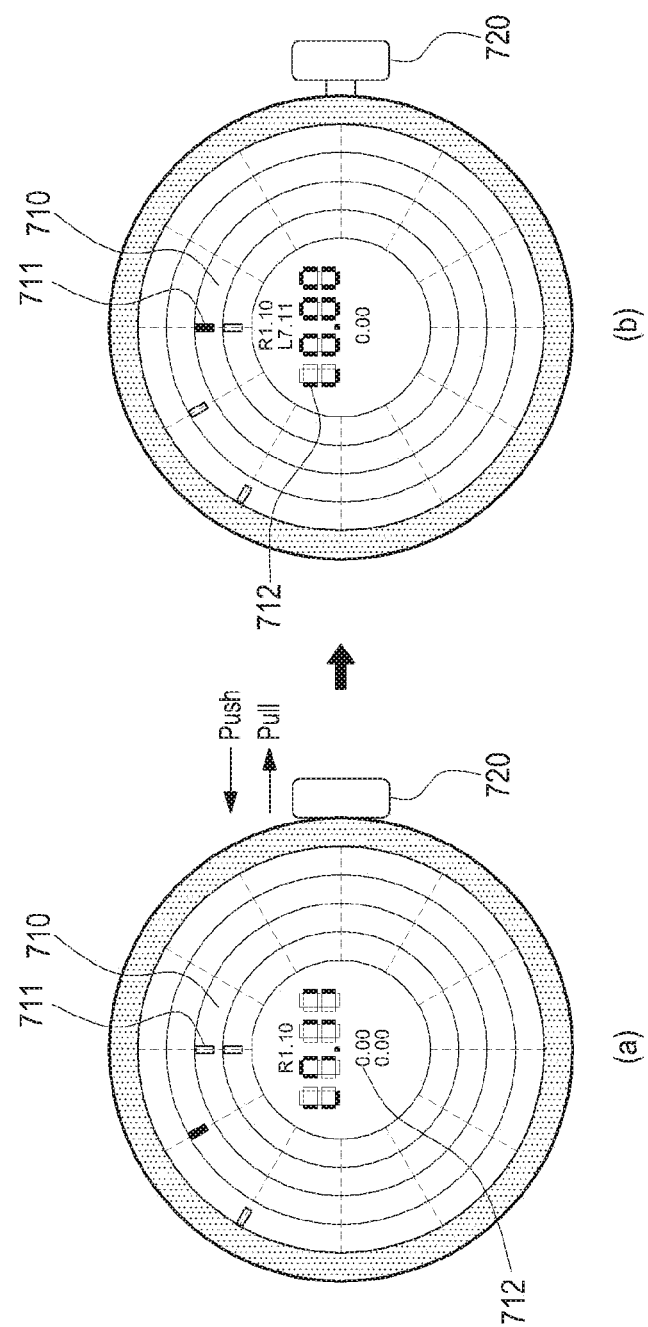
FIG. 7 illustrates an inputting method performed through a body of rotation of an electronic device according to embodiments of the present disclosure.

FIG. 7 illustrates an inputting method performed through a body of rotation of an electronic device according to embodiments of the present disclosure.

FIG. 7 illustrates a method of entering a phase for a second input through the body of rotation after completing a first input through the body of rotation. As described above, the number of inputs through the body of rotation may be determined based on a security level. In FIG. 7, it is assumed that inputting through the body of rotation needs to be performed a total of four times based on a security level.

For example, after completing a first input through the body of rotation, the user may touch a touch screen or press or pull a stem, which is one of the bodies of rotation, so as to enter the phase for a second input through the body of rotation. Particularly, the user may touch a circular ring 710 where the second input is displayed, or may press or pull a stem 720, so as to enter the phase for the second input.

As described above, when the phase is switched into the phase for the second input, a circular ring that displays the currently inputted second input may be displayed to be distinguished from a circular ring that displays another input, such as expressing the circular ring 710 that displays the second input in a different color or in three-dimensions, or expressing an indicator 711 displayed in the circular ring 710 in a different color. The visibility of the second input that is currently input is increased by changing the color of text 712 corresponding to the second input, which is displayed in the center of the touch screen, to be identical to the color of the circular ring that displays the second input.

According to an embodiment of the present disclosure, the electronic device sets the color of a previously inputted input value and the color of a circular ring or an indicator corresponding to the previously inputted input value to be identical, so that the user readily recognizes which values are input to correspond to which circular rings.

Until the phase for the first input is switched into the phase for the second input, the user may correct an input through the body of rotation using the body of rotation. The first input is determined when the phase for the first input is switched into the phase for the second input by touching the touch screen or pressing or pulling the stem.

According to an embodiment of the present disclosure, when the body of rotation is capable of sensing a pressure or force provided from the user, and the user presses at least a part of the body of rotation, the first input may be determined.

Figure 8:
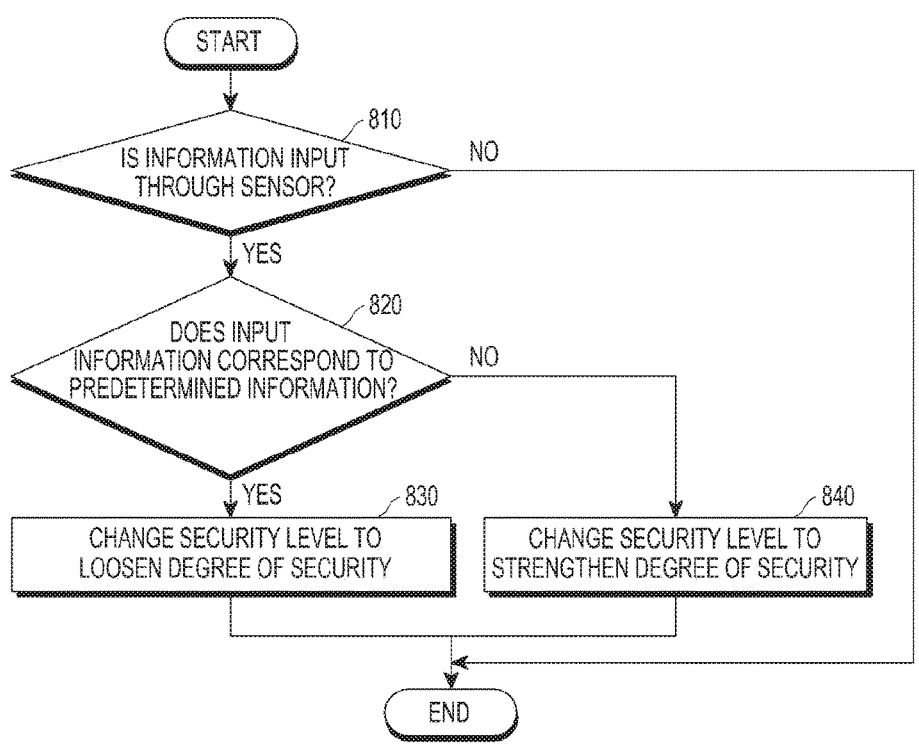
FIG. 8 illustrates a method for an electronic device to change a security level corresponding to an application or a service of the application according to embodiments of the present disclosure.

FIG. 8 illustrates a method for an electronic device to change a security level corresponding to an application or a service of the application according to embodiments of the present disclosure.

In step 810, the electronic device 101 determines, through a sensor, whether information for authenticating a user of the electronic device 101 is input, for example, biometric information, such as a fingerprint of the user. The electronic device 101 determines whether information used for authenticating the user is received through an input means of the electronic device 101, or whether security information is input, which is required to execute an application or a service of which execution is requested from the user. When information is input, the process proceeds to step 820. When no information is input, the process ends.

In step 820, the electronic device 101 determines whether information input through the sensor or the input means corresponds to predetermined information. When the information associated with a fingerprint that is input through the sensor is input, the electronic device 101 determines whether the information associated with the fingerprint that is input through the sensor is identical to fingerprint information stored in the electronic device 101.

When a photoplethysmography (PPG) signal or an electrocardiogram (ECG) signal is obtained through the sensor, the electronic device 101 determines whether the PPG signal or the ECG signal, which is obtained through the sensor, is identical to a PPG signal or an ECG signal that is stored in the electronic device 101.

The electronic device 101 determines whether the information input through the input means is identical to information stored in the electronic device 101 or information stored in association with an application or a service of which execution is requested.

In step 830, when the information input through the sensor or the input means corresponds to the predetermined information, the electronic device 101 changes the security level of the application or the service to decrease the degree of security based on a predetermined standard.

In step 840, when the information obtained through the sensor or the input means does not correspond to the predetermined information, the electronic device 101 changes the security level of the application or the service to increase the degree of security based on a predetermined standard.

According to an embodiment of the present disclosure, whether the user wears the electronic device may be determined through a sensor of the electronic device, and the security level may be set to a first security level when the user initially wears the electronic device. For example, until it is determined, through the sensor, that the user removes the electronic device, the security level of the application or the service may be maintained to be the second security level which is looser than the first security level. When it is determined, through the sensor that the user takes off the electronic device, the security level is changed from the second security level to the first security level. When the user initially wears the electronic device, the security level may be maintained to be high. While the user maintains the state of wearing the electronic device, the security level of the electronic device may be switched into a lower level so that the user's convenience is increased. When the user removes the electronic device, the electronic device sets the security level of the electronic device to be high.

According to an embodiment of the present disclosure, when the user who wears the electronic device 101 is not registered in the electronic device 101, the electronic device 101 changes a security level. For example, the electronic device 101 obtains user authentication information, such as a fingerprint, a PPG signal, or an ECG signal, from a user who currently wears the electronic device 101, and compares the obtained information and information that is stored for authenticating a user. When the obtained user authentication information corresponds to the stored user authentication information, the electronic device 101 changes the security level to decrease the degree of security. When the obtained user authentication information does not correspond to the stored user authentication information, the electronic device 101 changes the security level to increase the degree of security.

Changing the security level may correspond to changing and resetting the security level set for the application or the service, or may correspond to temporarily applying a changed security level to a current execution request. When the security level is temporarily changed and applied, the original security level that is used before changing may be checked again when the execution of the application or the service is requested later.

Figure 9A:
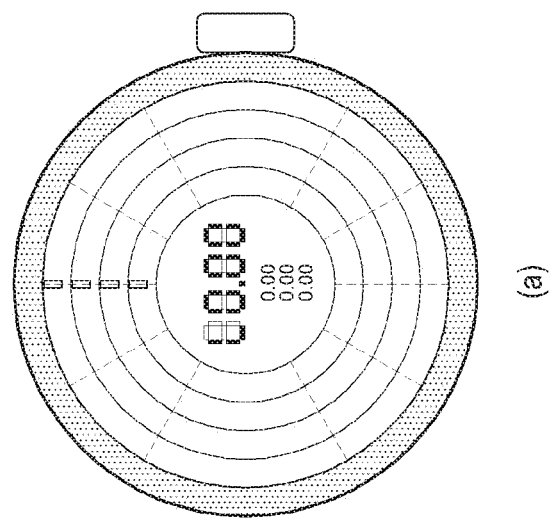
FIGS. 9A and 9B illustrate a graphic object that is changed and displayed as a security level is changed, according to embodiments of the present disclosure.
Figure 9A:
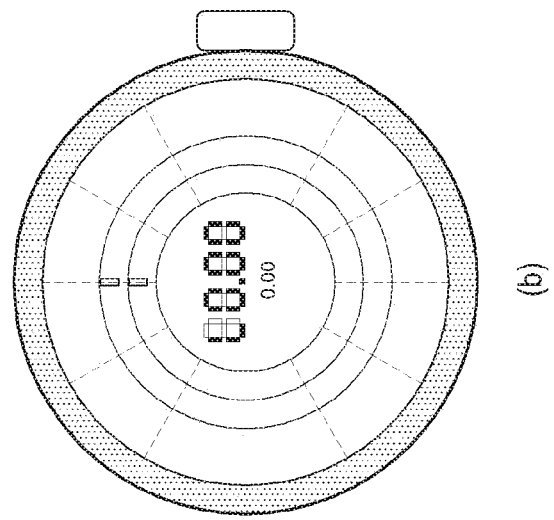
Figure 9B:
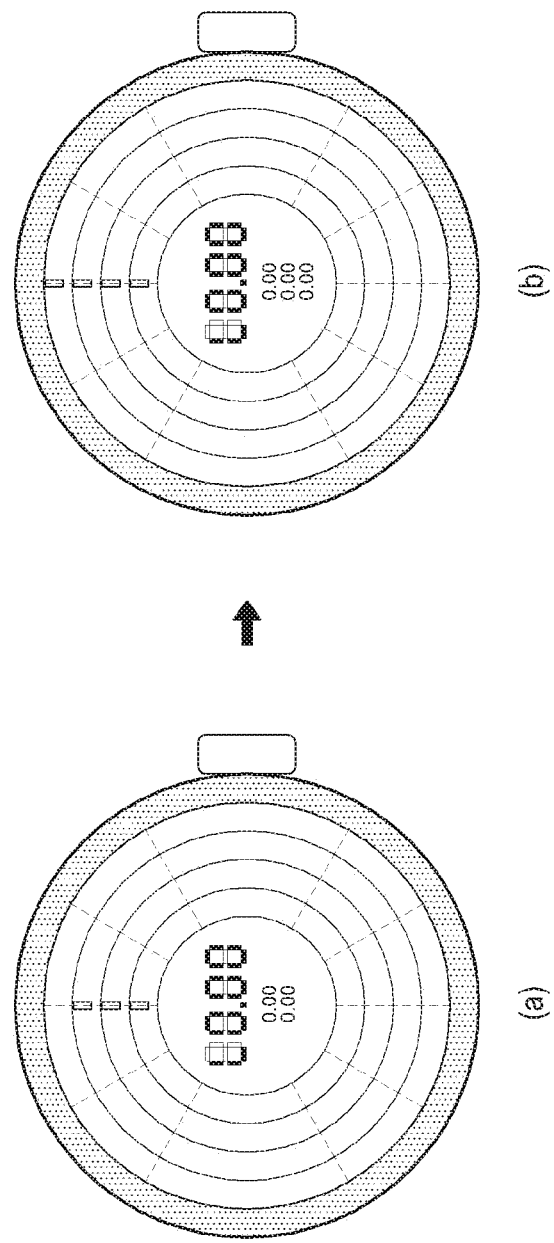

FIGS. 9A and 9B illustrate a graphic object that is changed and displayed as a security level is changed, according to embodiments of the present disclosure.

According to FIG. 9A, the case will be described in which information used for authenticating a user is input through a sensor or an input means of the electronic device 101, and a security level is changed to decrease the degree of security since the input information corresponds to predetermined information.

As described above, the number of inputs through the body of rotation may be determined based on a security level, and when the security level is changed to decrease the degree of security, the number of inputs through the body of rotation or angle recognition information is decreased.

A graphic object is displayed based on a security level, and thus, when the security level is changed based on information through a sensor or an input means, a first graphic object that is displayed to indicate 4 inputs, which corresponds to the number of inputs through the body of rotation as illustrated in diagram (a) of FIG. 9A, is changed into a second graphic object that is displayed to indicate 2 inputs, which corresponds to the number of inputs through the body of rotation, as illustrated in diagram (b) of FIG. 9A. When the angle recognition level is decreased as the security level is changed, a graphic object is changed and displayed to enable a reference line to be decreased based on the decreased angle recognition level.

FIG. 9B describes when information used for authenticating a user is input through a sensor or an input means of the electronic device 101, and a security level is changed to increase the degree of security since the input information does not correspond to predetermined information.

As described above, the number of inputs through the body of rotation or an angle recognition level may be determined based on a security level, and when the security level is changed to increase the degree of security, the number of inputs through the body of rotation or angle recognition information is increased.

A graphic object is displayed based on a security level, and thus, when the security level is changed based on information through a sensor or an input means, a second graphic object that is displayed to indicate 3 inputs, which corresponds to the number of inputs through the body of rotation as illustrated in diagram (a) of FIG. 9B, is changed into a first graphic object that is displayed to indicate 4 inputs, which corresponds to the number of inputs through the body of rotation, as illustrated in diagram (b) of FIG. 9B. When the angle recognition level is increased as the security level is changed, a graphic object is changed and displayed to enable a reference line to be increased based on the increased angle recognition level.

As described above, the electronic device 101 changes a security level set for the application or service of which execution is requested, and when the security level is changed, a graphic object for indicating an input through the body of rotation is changed to correspond to the changed security level.

Figure 10:
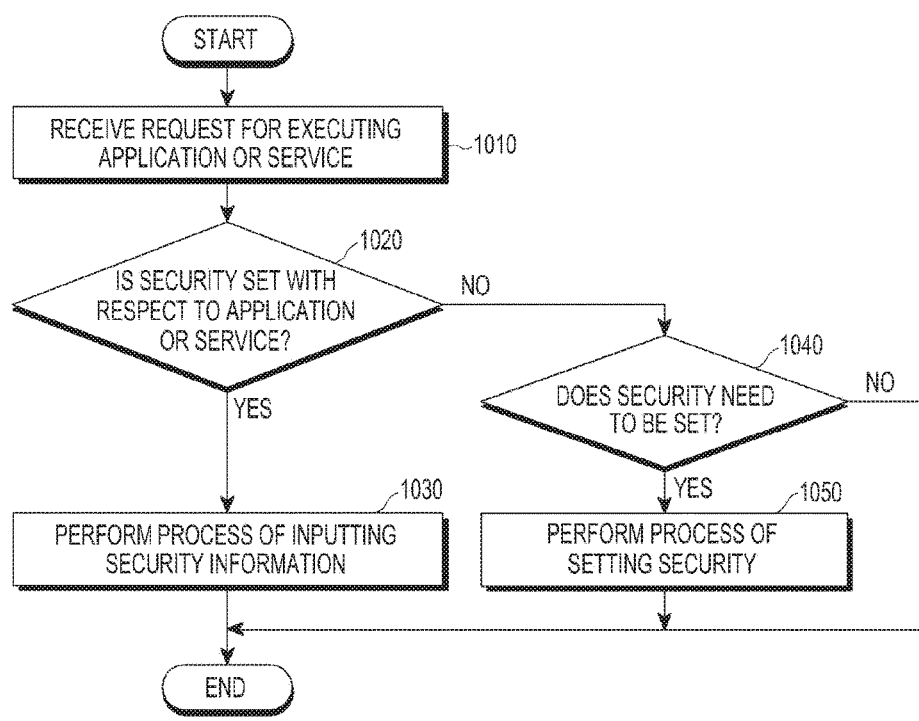
FIG. 10 illustrates operations that are executed by an electronic device in response to a request for executing an application or a service of the application from a user, according to embodiments of the present disclosure.

FIG. 10 illustrates operations that are executed by an electronic device in response to a request from a user for executing an application or a service of the application, according to embodiments of the present disclosure.

In step 1010, the electronic device 101 receives an application or service execution request. The execution of the application or the service may be requested by an input from a user, or may be requested by a request from another electronic device.

In step 1020, the electronic device 101 determines whether to set security with respect to the application or the service. Not all of the applications or the services included in the electronic device 101 may require security, and accordingly, security may not be set with respect to the applications or services that do not require security. Although the application or service requires security, the application or the service may be in a state before being secured.

In step 1030, when it is determined that the security is set with respect to the application or the service, the electronic device 101 performs a process of inputting security information, which has been described in FIG. 4. When the process of inputting the security information is performed, the electronic device 101 executes the application or the service of which execution is requested.

When the execution request is received from an external electronic device, the electronic device 101 may interwork with the external electronic device so as to execute the application or the service in the external electronic device.

In step 1040, when it is determined that the security is not set with respect to the application or the service, the electronic device 101 determines whether setting security with respect to the application or the service is required.

In step 1050, when setting security with respect to the application or the service is required, the electronic device 101 sets security with respect to the application or the service, and a detailed method of setting security will be described with reference to FIG. 11.

When the application or the service does not require setting security, the electronic device 101 executes the application or the service without separately performing a security setting process, in response to the execution request received in step 1010, and the process ends.

Figure 11:
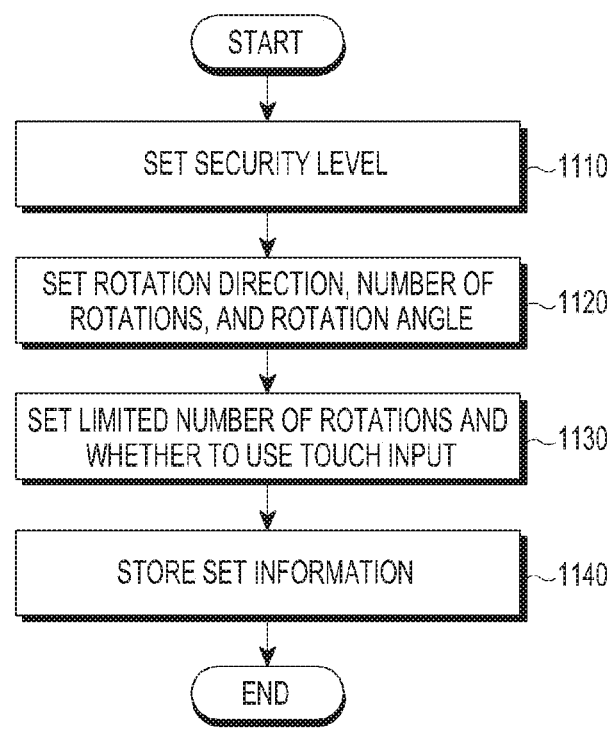
FIG. 11 illustrates a security setting method using an input through a body of rotation of an electronic device according to embodiments of the present disclosure.

FIG. 11 illustrates a security setting method using an input through a body of rotation of an electronic device according to embodiments of the present disclosure.

A security setting method that is described in FIG. 11 is performed for each application or service that needs to be secured, and security information or the like in association with setting security may be stored to be matched to an application or a service to which the security is set.

In step 1110, the electronic device 101 sets a security level with respect to an application or a service. The security level may indicate the degree of security that is required to execute the application or the service. For example, the security level may be distinguished as three levels, such as "low", "medium", and "high", or may be distinguished as five levels, such as "level 1", "level 2", "level 3", "level 4", and "level 5". As described above, the security level may be variously set based on a user's setting or the like. The security level may be automatically set based on the characteristic of an application or a service. With respect to a payment service, a security level corresponding to the highest degree of security may be automatically set. With respect to an image viewer application or the like, a security level corresponding to the lowest degree of security may be automatically set.

Based on the set security level, the number of inputs through the body of rotation, and the angle recognition level of the body of rotation may be determined. For ease of description, it is assumed that the security level is distinguished as three levels, which are "low", "medium", and "high".

In this instance, when the security level is set to "low", the number of inputs through the body of rotation is set to 2, the angle recognition level is set to 4 units (each is distinguished based on 90 degrees), a limited number of rotations is set to 1, and a rotation direction is set not to be distinguished. The limited number of rotations is the maximum number of rotations that may be used for one input through the body of rotation. When the number of rotations is excessively high, the time expended for executing the input through the body of rotation increases, and thus, the limited number of rotations that may limit the number of rotations of the input through the body of rotation may be used.

Accordingly, when the number of rotations of the body of rotation is greater than the limited number of rotations, the electronic device 101 reports that the rotation is incorrect, initializes the number of rotations to 0, or changes the current number of rotations to the maximum number of rotations executed in the direction that is opposite to the current rotation direction. When the number of rotations is high, the user may experience difficulty in executing inputting through the body of rotation, or a probability is high that an erroneous input occurs, and thus, the number of rotations needs to be limited.

When the limited number of rotations is 3, the number of rotations of the body of rotation in a single input through the body of rotation may not be set to a number that exceeds 3. The limited number of rotations may be also displayed in a display of the electronic device 101. When the limited number of rotations is 1, information associated with the number of rotations in an input through the body of rotation may be omitted.

When the security level is set to "medium", the number of inputs through the body of rotation is set to 4, the angle recognition level is set to 12 units (each is distinguished based on 30 degrees), a limited number of rotations is set to 10, and a rotation direction is set to be distinguished. When the security level is set to "high", the number of inputs through the body of rotation is set to 6, the angle recognition level is set to 60 units (each is distinguished based on 6 degrees), a limited number of rotations is set to 10, and a rotation direction is set to be distinguished.

As described above, as a security level is set, the degree of an input through the body of rotation, which corresponds to the set security level, may be determined. The degree of an input through the body of rotation, which corresponds to the set level, is changed based on a user's setting or the like.

To further increase the security level, the value of a rotation angle displayed in the display of the electronic device 101 may be displayed in the display to enable only a user who executes a security setting process to recognize the rotation angle, such as by displaying numbers sequentially, randomly mixing up and displaying numbers, displaying a desired number in a desired location, displaying alphabet letters or characters sequentially instead of numbers, randomly mixing up alphabet letters or characters, or displaying a desired character in a desired location.

In step 1120, the electronic device 101 sets an input through the body of rotation based on the set security level, based on a user's input. For example, the electronic device 101 sets at least one out of the rotation direction of the body of rotation, the number of rotations of the body of rotation, and the rotation angle of the body of rotation, for each input through the body of rotation, based on a user's input.

For example, based on a user's input, the electronic device 101 sets 2 rotations executed rightward and a rotation angle of 300 degrees with respect to a first input, sets a single rotation executed leftward and a rotation angle of 210 degrees with respect to a 15 second input, and sets 5 rotations executed leftward and a rotation angle of 30 degrees with respect to a third input.

In step 1130, the electronic device 101 sets the limited number of rotations and whether to use a touch input based on a user's input. The electronic device 101 sets a limited number of rotations for each input through the body of rotation, within the limited number of rotations corresponding to the set security level, or sets a limited number of rotations to be applied to all of the inputs through the body of rotation.

The electronic device 101 sets use of a touch input for adjusting an input through the body of rotation. As illustrated in FIGS. 6A, 6B, 6C and 6D, to conveniently and quickly execute inputting through the body of rotation, the electronic device 101 sets use of a touch input, which is one of the input means included in the electronic device 101. Although the descriptions will be provided from the perspective of determining whether to use a touch input, for ease of description, whether to use another input means included in the electronic device 101 may also be set.

In step 1140, the electronic device 101 stores information associated with a result of setting security with respect to an application or a service. The electronic device 101 requests a user to reconfirm the set information before storing the information, and stores the information after the set information is reconfirmed.

The electronic device 101 converts predetermined security information to correspond to an input through the body of rotation, and stores the information. For example, descriptions will be made in association with when the security information used for executing an application or a service is set in advance to "430-513-038-194", and a method of converting the security information to correspond to an input through the body of rotation based on a predetermined scheme. The predetermined scheme used for the conversion may be a scheme that may be set by a user and recognized by the user, and thus, the user recognizes the security information that is stored after being converted to correspond to the input of the body of rotation.

For example, the electronic device 101 changes the predetermined security information "430-513-038-194" into "R04.30, R05.13, L00.38, L01.94", and sets the same. When a rotation direction is set in advance, the electronic device 101 may use the rotation direction. When the rotation direction is not set in advance, the electronic device 101 may request a user to input a rotation direction.

Accordingly, the security information used when the user executes the application or the service may be input through the body of rotation. For example, to execute the application or the service, the user completes inputting a first input by executing 4 rotations rightward by an angle corresponding to 30 units, and entering a phase for a second input. Subsequently, the user completes the second input by executing 5 rotations rightward by an angle corresponding to 13 units, and entering a phase for a third input. The user then completes the third input by executing rotation leftward by an angle corresponding to 38 units, and entering a phase for a fourth input, and completes the fourth input by executing a single rotation leftward by an angle corresponding to 94 units, and thus, completes inputting security information for executing the application or the service.

When the predetermined security information, "430-513-038-194", is information used for accessing another electronic device, the user executes user authentication through input directions in the first through fourth inputs as inputting is completed, and transmits information associated with the number of rotations and a rotation angle to the other electronic device. The other electronic device determines whether to interwork with the electronic device 101 through the information associated with the number of rotations and the rotation angle.

The rotation direction may be used as personal identification information. When a plurality of persons desire to access a single external electronic device based on respective settings, the external electronic device may assign a directivity code to each of the plurality of persons. The external electronic device stores a setting to be different for each of the plurality of persons, and changes a setting based on a directivity code received through the electronic device 101. The user may input a directivity code in addition to security information for accessing the external electronic device through the electronic device 101 including a body of rotation. For example, the rotation direction information of the body of rotation may be used as a directivity code. Therefore, as described above, the rotation direction of the body of rotation may be used to authenticate the user, and may be transmitted to the external electronic device so that the external electronic device is changed to a setting corresponding to the user.

For example, it is assumed that A mainly uses a stereo for listening to rock music and B mainly uses a stereo for listening to classical music. In this instance, when A accesses the stereo by inputting a directivity code "R-R-R-L" which is assigned to A, into an electronic device including a body of rotation, the stereo provides rock music even though an additional input is not received, and may adjust sound and other settings to be appropriate for rock music. Conversely, when B accesses the stereo by inputting a directivity code "L-R-L-R" which is assigned to B, into an electronic device including a body of rotation, the stereo provides classical music even though an additional input is not received, and may adjust sound and other settings to be appropriate for classic music.

FIGS. 12A, 12B, 12C and 12D illustrate a method of inputting security information using a body of rotation of an electronic device according to embodiments of the present disclosure.

FIGS. 12A, 12B, 12C and 12D will describe a method of inputting, through a body of rotation, security information that is used for financial transaction. When it is desired to input security information through the body of rotation, a rotation direction to be used for inputting security information when financial transaction is used may be set in advance. Hereinafter, for ease of description, it is assumed that a user needs to input 4 pieces of security information for financial transaction, and the user sets a rotation direction in an order of R-L-L-R for inputting security information. However, this is merely an example, and the present disclosure is not limited thereto.

Figure 12A:
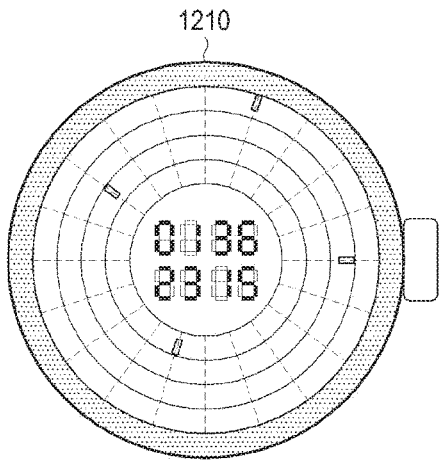
FIGS. 12A, 12B, 12C and 12D illustrate a method of inputting security information using a body of rotation of an electronic device according to embodiments of the present disclosure.

FIG. 12A illustrates when a security card 1211 displaying security information is manufactured to correspond to an input through a body of rotation. The security card 1211 displays the number of rotations and a rotation angle according to an identification number in the range of 1 to 50. For example, numbers "1.21" may be displayed to correspond to an identification number "1", and the numbers "1.21" may indicate that the number of rotations of the body of rotation is 1 and the rotation angle corresponds to 21 units. In the same manner, the numbers "1.28" corresponding to an identification number "38" indicates that the number of rotations of the body of rotation is 1 and the rotation angle corresponds to 28 units.

In the electronic device 1210 used for financial transaction, an angle recognition level is set to 20. Accordingly, 1 unit indicates 18 degrees.

Figure 12B:
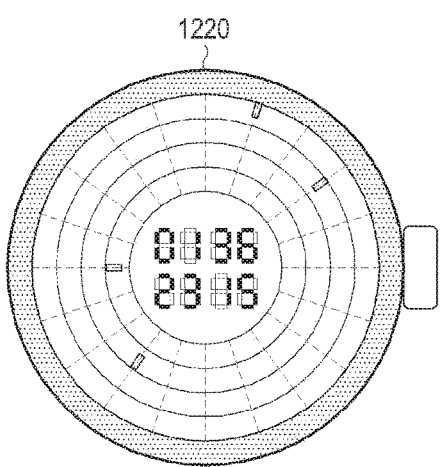
Figure 12C:
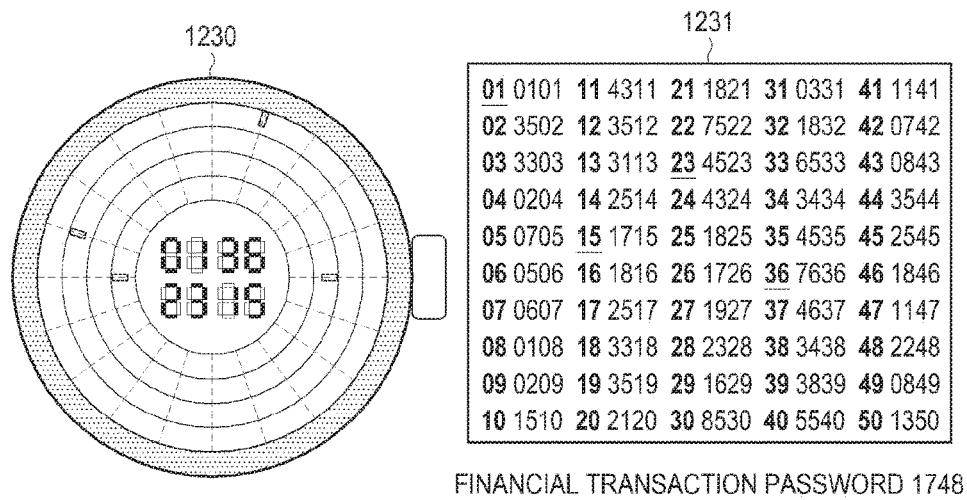

When the user needs to input security information for financial transaction, 4 identification numbers that need to be input out of 50 identification numbers of the security card 1211 may be displayed in the electronic device 1210. FIGS. 12A to 12C assume that the identification numbers to be input are 1, 36, 23, and 15.

Numbers corresponding to the identification numbers are "1.21", "1.05", "1.17", and "4.11", respectively, and the rotation direction is set to "R-L-L-R", and thus, the user may input security information by rotating the body of rotation to correspond to "R1.21", "L1.05", "L1.17", and "R4.11" for the financial transaction. Particularly, the user may input the security information by rotating the body of rotation rightward once by 21 units for a first input, rotating the body of rotation leftward once by 5 units for a second input, rotating the body of rotation leftward once by 17 units for a third input, and rotating the body of rotation rightward four times and rotates the body of rotation by 11 units for a fourth input.

FIG. 12B illustrates when a security card 1221 displaying security information is manufactured to correspond to four-digit numbers, as opposed to corresponding to an input through a body of rotation.

In this instance, when the user needs to input security information for financial transaction, 4 identification numbers that need to be input out of 50 identification numbers of the security card 1221 may be displayed in the electronic device 1220.

The numbers corresponding to the identification numbers are "0101", "7636", "4523", and "1715", respectively, and a rotation direction is set to "R-L-L-R". Unlike FIG. 12A, the security card 1221 of FIG. 12B is not set to correspond to an input of the body of rotation, and thus, a scheme that is different from FIG. 12A may be applied to input the information.

According to an embodiment of the present disclosure, the security information to be input through the body of rotation may be determined based on the set rotation direction. When the set rotation direction is to the right, an input through the body of rotation may be determined based on three digits from the right. When the set rotation direction is to the left, an input through the body of rotation may be determined based on three digits from the left.

With respect to identification numbers 1 and 15, which correspond to when the rotation direction is to the right, an input through the body of rotation may be respectively determined based on "101" and "715", which are three digits from the right of the corresponding numbers "0101" and "1715". Accordingly, to input a first input corresponding to the identification number "1", the user may rotate the body of rotation rightward once by one unit. To input a fourth input corresponding to the identification number "15", the user may rotate the body of rotation rightward 7 times and rotates the body of rotation by 15 units.

With respect to identification numbers 36 and 23, which correspond to when the rotation direction is to the left, an input through the body of rotation may be respectively determined based on "763" and "452", which are three digits from the left of the corresponding numbers "7636" and "4523". Accordingly, to input a second input corresponding to the identification number "36", the user may rotate the body of rotation leftward 7 times and rotates the body of rotation by 63 units. To input a third input corresponding to the identification number "23", the user may rotate the body of rotation leftward 4 times and rotates the body of rotation by 52 units.

As described above, even when the security card 1221 is manufactured not to correspond to an input through the body of rotation, the user may input security information required for the financial transaction based on a predetermined scheme. Although FIG. 12B illustrates a method of selecting three digits from a four-digit number displayed in the security card 1221 based on a rotation direction, and inputting the same, this is merely an example for illustrative purposes. The present disclosure is not limited thereto, and all of the displayed four-digits may be used.

FIG. 12C illustrates when additional financial transaction password "1748" is required in addition to a security card 1231, for financial transaction. In this instance, when the user needs to input security information for financial transaction, 4 identification numbers that need to be input out of 50 identification numbers of the security card 1231 may be displayed in the electronic device 1230.

Also, each digit of the financial transaction password "1748" may indicate the number of rotations of the body of rotation used when identification numbers respectively corresponding to 1, 36, 23, and 15 are input.

In FIG. 12C, the security information displayed in the security card 1231, which needs to be input through the body of rotation, may be determined based on the set rotation direction, as in FIG. 12B. For example, as inputting the financial transaction password is additionally required, when the set rotation direction is to the right, an input through the body of rotation may be determined based on two digits from the right. When the set rotation direction is to the left, an input through the body of rotation may be determined based on two digits from the left. The financial transaction password may be input as the number of rotations of each input. For example, as the financial transaction password is 1748, the number of rotations of a first input is set to 1, the number of rotations of a second input is set to 7, the number of rotations of a third input is set to 4, and the number of rotations of a fourth input is set to 8.

With respect to identification numbers 1 and 15, which correspond to when the rotation direction is to the right, an input through the body of rotation may be respectively determined based on "01" and "15", which are two digits from the right of the corresponding numbers "0101" and "1715". Accordingly, to input a first input corresponding to the identification number "1", the user may rotate the body of rotation rightward once by one unit. To input a fourth input corresponding to the identification number "15", the user may rotate the body of rotation rightward 8 times and rotates the body of rotation by 15 units.

With respect to identification numbers 36 and 23, which correspond to when the rotation direction is to the left, an input through the body of rotation may be respectively determined based on "76" and "45", which are two digits from the left of the corresponding numbers "7636" and "4523". Accordingly, to input a second input corresponding to the identification number "36", the user may rotate the body of rotation leftward 7 times and rotates the body of rotation 76 units. To input a third input corresponding to the identification number "23", the user may rotate the body of rotation leftward 4 times and rotates the body of rotation 45 units.

As described above, when an additional password is required for financial transaction, it may be input, through the body of rotation, together with the security information displayed in the security card 1231. The additional password may be input through a separate input through the body of rotation, and various methods may be used.

Figure 12D:
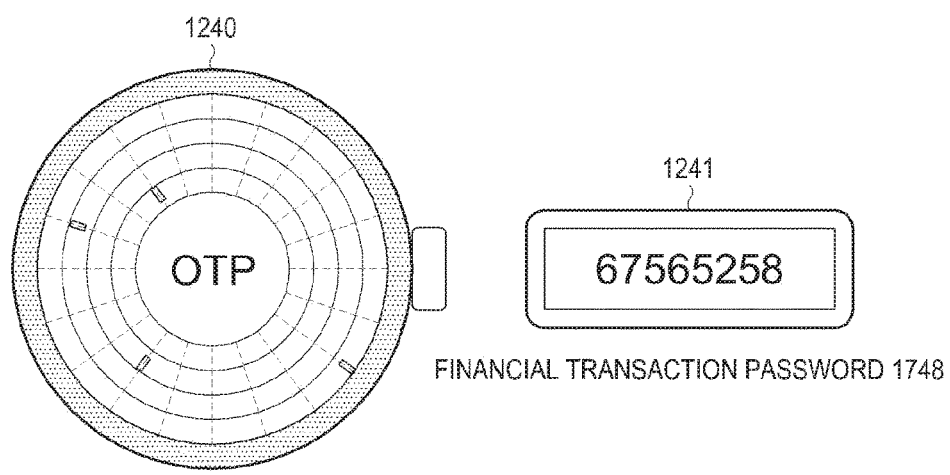

FIG. 12D illustrates when a one-time password (OTP) 1241, which is different from a security card, and additional financial transaction password are used for financial transaction. In this instance, when a user needs to input security information for financial transaction, information indicating that the OTP 1241 is used may be displayed in the electronic device 1240.

Also, each digit of the financial transaction password "1748" may indicate the number of rotations of the body of rotation used when the security information displayed in the OTP 1241 is input through the body of rotation.

When the security information displayed in the OTP 1241 is an 8-digit number "67565258", the information may be input through the body of rotation by 2 digits. For example, an input through the body of rotation indicating "67" is input through a first input. An input through the body of rotation indicating "56" is input through a second input. An input through the body of rotation indicating "52" is input through a third input. An input through the body of rotation indicating "58" is input through a fourth input.

The number of rotations of the first input to the fourth input may be determined based on a financial transaction password, and "R-L-L-R", which is a predetermined rotation direction, may be used as a rotation direction. Accordingly, the user rotates the body of rotation rightward once and rotates 67 units to input the first input, rotates the body of rotation leftward 7 times and rotates 56 units to input the second input, rotates the body of rotation leftward 4 times and rotates 52 units to input the third input, and rotates the body of rotation rightward 8 times and rotates 58 units to input the fourth input.

As described above, the security information displayed in the OTP 1241 and the financial transaction password, which are used for financial transactions, may be input through the body of rotation included in the electronic device 101.

Figure 13:
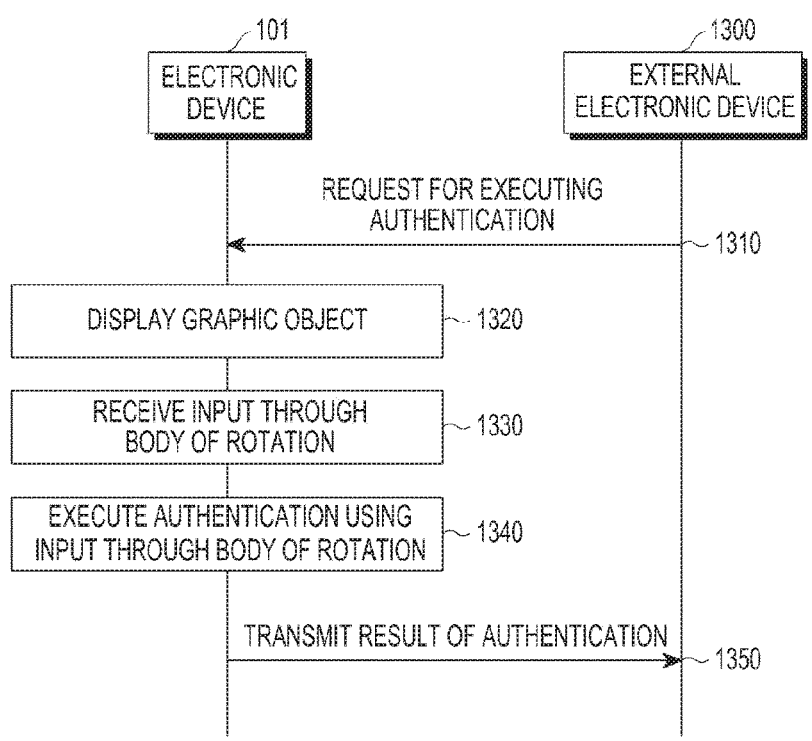
FIG. 13 illustrates operations that are executed by an electronic device in response to a request for security information from an external electronic device according to embodiments of the present disclosure.

FIG. 13 illustrates operations that are executed by an electronic device in response to a request for security information from an external electronic device according to embodiments of the present disclosure.

In FIG. 13, a method for the electronic device 101 to execute authentication in response to an authentication request received from the external electronic device 1300, will be described.

In step 1310, the external electronic device 1300 transmits, to the electronic device 101, a request for executing authentication with respect to a user when the authentication with respect to the user is required to execute an application or a service.

In step 1320, in response to the request for executing authentication with respect to the user, the electronic device 101 displays, in a display, a graphic object for authenticating the user. The graphic object for authenticating the user may be displayed in the display, as illustrated in FIG. 5, so as to indicate an input through the body of rotation.

In step 1330, the electronic device 101 receives an input through the body of rotation. The user performs inputting through the body of rotation to correspond to predetermined information, such as a password.

In step 1340, the electronic device 101 determines whether the input received through the body of rotation corresponds to the predetermined information, and authenticates the user based on a result of the determination.

In step 1350, the electronic device 101 transmits the result of authentication to the external electronic device 1300 through a communication interface, such as the communication interface 170). The external electronic device 1300 determines whether to execute the application or service based on the received result of authentication.

Figure 14:
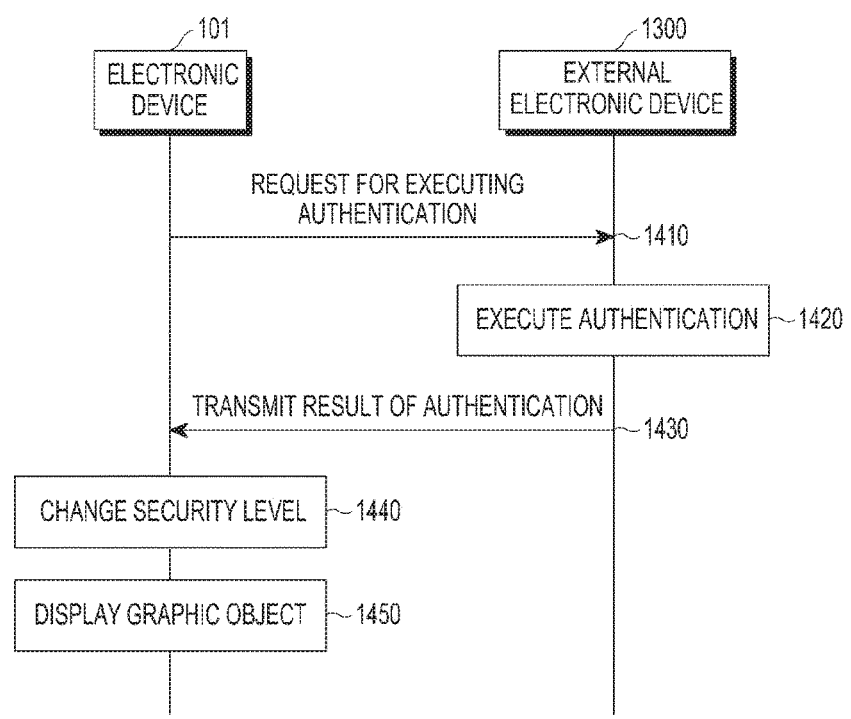
FIG. 14 illustrates operations in which an electronic device requests security information from an external electronic device and processes the security information according to embodiments of the present disclosure.

FIG. 14 illustrates operations in which an electronic device requests security information from an external electronic device and processes the security information according to embodiments of the present disclosure.

FIG. 14 illustrates a method for the electronic device 101 to request, through a communication interface 170, the external electronic device 1300 to execute authentication, and changes a security level based on the result of authentication that is received.

In step 1410, the electronic device 101 transmits a request for executing authentication with respect to a user, to the external electronic device 1300 in a process of executing an application or a service.

In step 1420, in response to the authentication request, the electronic device 1300 executes authentication with respect to the user. The external electronic device 1300 compares information received through an input means of the external electronic device 1300 and information set in advance for authentication, and executes authentication with respect to the user.

In step 1430, the external electronic device 1300 transmits the result of the authentication to the electronic device 101.

In step 1440, the electronic device 101 changes the security level with respect to the application or the service based on the result of the authentication. When the result of the authentication indicates a successful authentication, the electronic device 101 changes the security level to decrease the degree of security. Conversely, when the result of the authentication indicates a failed authentication, the electronic device 101 changes the security level to increase the degree of security.

In step 1450, the electronic device 101 displays, in a display 160, a graphic object for indicating an input through the body of rotation, based on the determined security level. When the security level is changed to decrease the degree of security, the electronic device 101 changes the graphic object to decrease the number of inputs through the body of rotation and displays the same. When the security level is changed to increase the degree of security, the electronic device 101 changes the graphic object to increase the number of inputs through the body of rotation and displays the changed graphic object.

Figure 15:
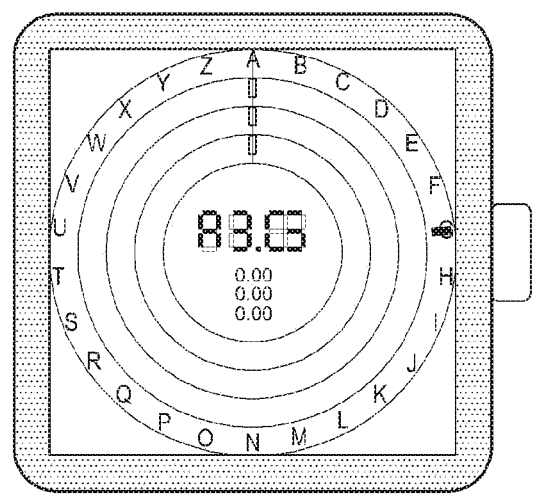
FIG. 15 illustrates a method of inputting a character using a body of rotation of an electronic device according to embodiments of the present disclosure.

FIG. 15 illustrates a method of inputting a character using a body of rotation of an electronic device according to embodiments of the present disclosure.

In FIG. 15, a user sets security information by using characters in addition to numbers. When a user desires to use numbers "3528" and characters "GBNT" as security information, the electronic device 101 converts the security information including the numbers and characters to correspond to an input through the body of rotation, based on a predetermined scheme, and stores the same. The predetermined scheme used for the conversion may be a scheme that may be set by a user and recognized by the user, and thus, the user recognizes the security information that is stored after being converted to correspond to the input of the body of rotation.

For example, security information that is obtained by converting the security information including the numbers "3528" and the characters "GBNT" to correspond to an input through the body of rotation may be "R3.G, L5.B, R2.N, L8.T", where the rotation direction may be set in advance by the user, the number indicates the number of rotations of the body of rotation, and the character indicates a rotation angle. To enable the user to recognize the rotation angle corresponding to the character, the electronic device 101 displays the character corresponding to the rotation angle in a display. Accordingly, as described in FIG. 15, the user readily rotates the body of rotation to the character that needs to be input, based on the character displayed in the electronic device 101.

When the security information used for accessing another electronic device uses only characters or uses characters and numbers together, a rotation angle may correspond to a character as opposed to a number. For example, security information used for accessing a vehicle is "1F, 713, 1Z, 001", the security information may be converted to "R1.F, L7.13, L1.Z, R0.01" to correspond to an input through the body of rotation based on a predetermined scheme. A predetermined rotation direction, such as "R-L-L-R" may be used as a rotation direction, the first digit of the security information used for accessing the vehicle is set to the number of rotations, and a character or the last two-digit number may be set to a rotation angle.

As described above, when a character needs to be input in an input through the body of rotation as in FIG. 15, the electronic device 101 displays character to correspond to a corresponding rotation angle. The electronic device 101 displays a separate menu to display a character in a screen so as to display the character, may include a separate button for displaying a character, or displays a character when the body of rotation is pressed when the body of rotation is capable of being pressed.

Figure 16:
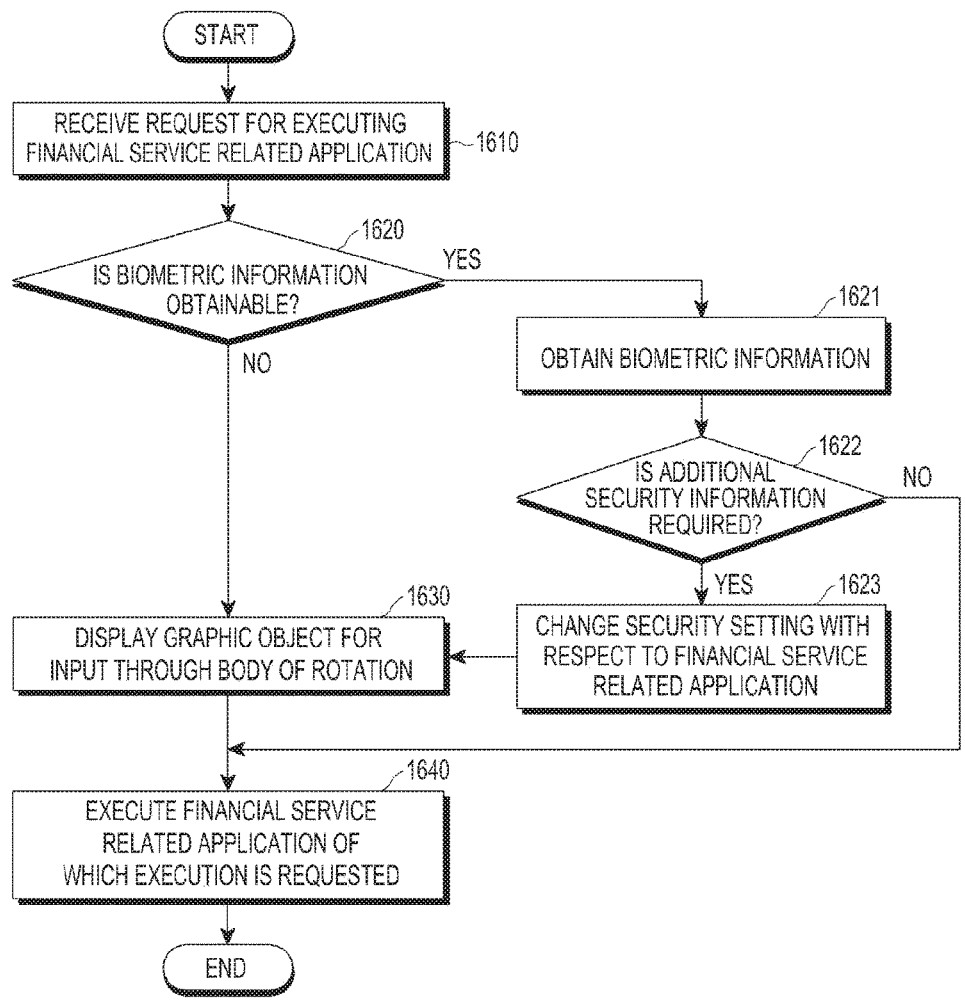
FIG. 16 illustrates a method for an electronic device to execute a financial service according to embodiments of the present disclosure.

FIG. 16 illustrates a financial service execution method of an electronic device according to embodiments of the present disclosure.

In step 1610, the electronic device 101 receives a request for executing a financial service related application that is installed in the electronic device 101 or another electronic device that interworks with the electronic device 101. The financial service related application may require security information, such as user authentication information, for executing the finance related application or executing a financial service that is provided from the application. Hereinafter, although the descriptions will be provided from the perspective of a financial service related application, the present disclosure is not limited thereto. The present disclosure may be applied to all of a financial service provided from the finance related application, an application that requires security information, and a service provided from the application.

In step 1620, the electronic device 101 determines whether biometric information is obtainable, for executing the financial service related application, or whether biometric information is required to execute the finance related application.

In step 1630, when the biometric information is not obtainable, the electronic device 101 displays a graphic object for an input through a body of rotation based on a security setting associated with the financial service related application, and obtains security information that is input through the body of rotation from the user.

When the biometric information is not required and only security information is required to execute the financial service related application, the electronic device 101 displays a graphic object for an input through the body of rotation based on a security setting associated with the financial service related application, and obtains security information input by the user through the body of rotation.

When the finance related application is executed in another electronic device that interworks with the electronic device 101, and the interworking electronic device requests the electronic device 101 to input security information, the electronic device 101 transmits the obtained security information to the interworking electronic device.

In step 1640, when the obtained security information corresponds to security information set in the finance related application, the financial service related application may be executed.

Conversely, in step 1621, when the biometric information is obtainable for executing the financial service related application, or when the biometric information is required to execute the finance related application, the electronic device 101 obtains biometric information. The biometric information may be obtained through a sensor that senses biometric information, such as fingerprint information, iris information, facial information, r voice information included in the electronic device 101, or the biometric information may be obtained from another electronic device that interworks with the electronic device 101.

In step 1622, the electronic device 101 determines whether additional security information is required to execute the financial service related application, in addition to the obtained biometric information. When the additional security information is not required, the electronic device 101 executes the financial service related application in step 164.

Conversely, when the additional security information is required to execute the finance related application, the electronic device 101 changes a security setting associated with the financial service related application in step 1623. When the biometric information of a user is obtained and the user is authenticated, the security setting associated with the financial service related application may be loosened.

In step 1630, the electronic device 101 displays a graphic object for an input through the body of rotation based on the changed security setting associated with the financial service related application, and obtains security information input by the user through the body of rotation. When the obtained security information corresponds to the changed security information associated with the finance related application, the electronic device 101 executes the financial service related application or a financial service of the financial service related application.

Figure 17:
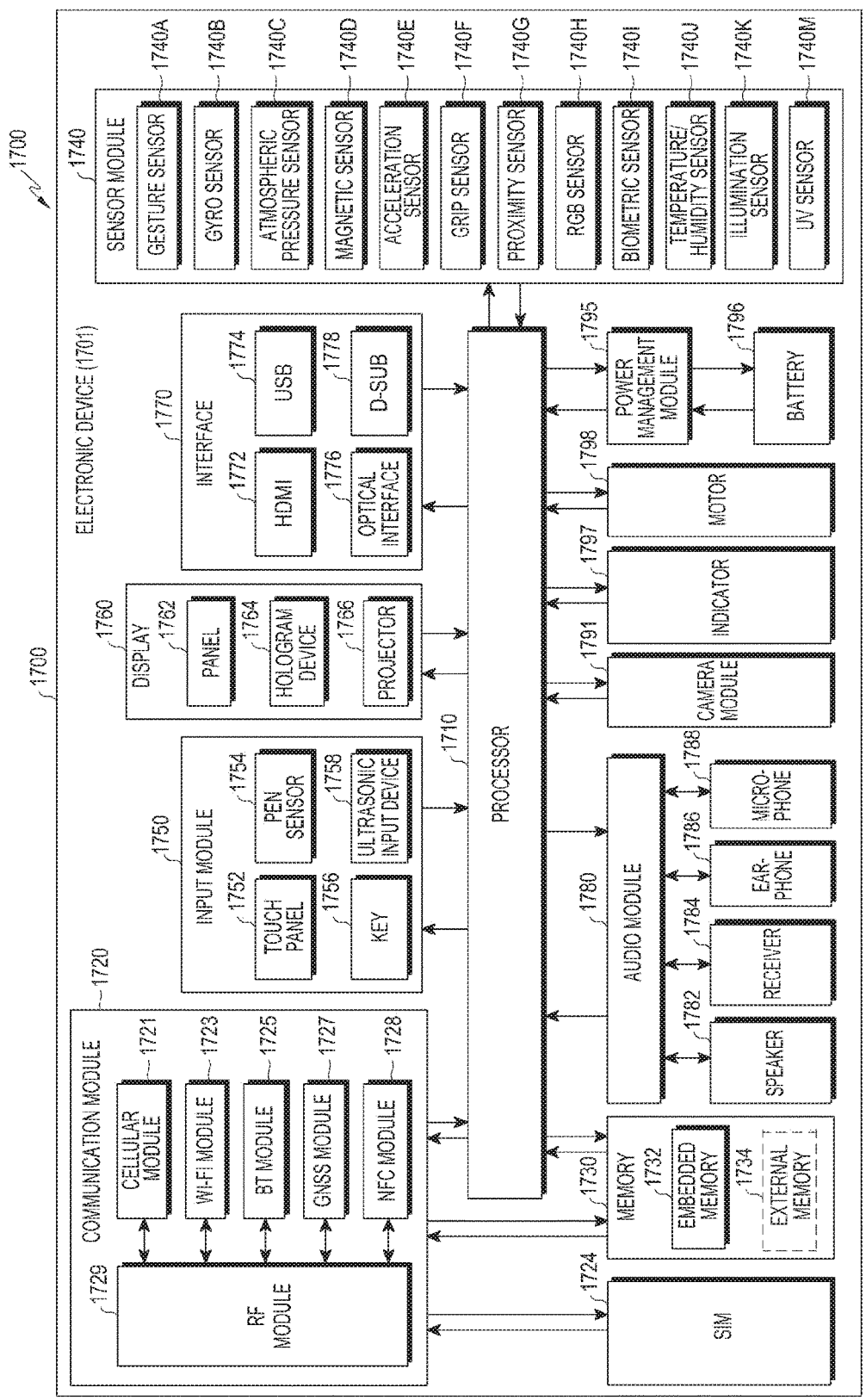
FIG. 17 is a block diagram of an electronic device according to embodiments of the present disclosure.

FIG. 17 is a block diagram of an electronic device 1701 according to embodiments of the present disclosure. The electronic device 1701 may include, for example, the whole or part of the electronic device 101 illustrated in FIG. 1. The electronic device 1701 may include at least one processor, such as application processor (AP) 1710, a communication module 1720, a subscriber identification module (SIM) 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 controls a plurality of hardware or software components connected to the processor 1710 by driving an operating system or an application program, and performs various data processing and calculations. The processor 1710 may be embodied as, for example, a system on chip (SoC). According to an embodiment of the present disclosure, the processor 1710 may further include a graphic processing unit (GPU) and/or an image signal processor. The processor 1710 may include at least some of the components illustrated in FIG. 17. The processor 1710 loads, into a volatile memory, instructions or data received from at least one of the other components, processes the loaded instructions or data, and stores various data in a non-volatile memory.

The communication module 1720 may have a configuration that is identical or similar to that of the communication interface of FIG. 1. The communication module 1720 may include, for example, a cellular module 1721, a Wi-Fi module 1723, a Bluetooth™ (BT) module 1725, a GNSS module 1727, such as a GPS module, a Glonass module, a Beidou module, or a Galileo module), an NFC module 1728, and a radio frequency (RF) module 1729.

For example, the cellular module 1721 provides a voice call, an image call, a text message service, or an Internet service through a communication network. According to an embodiment of the present disclosure, the cellular module 1721 may identify and authenticate the electronic device 1701 within a communication network using the SIM card 1724. According to an embodiment of the present disclosure, the cellular module 1721 performs at least some of the functions that the processor 1710 provides. According to an embodiment of the present disclosure, the cellular module 1721 may include a communication processor (CP).

The Wi-Fi module 1723, the BT module 1725, the GNSS module 1727, or the NFC module 1728 may include, for example, a processor that processes data transmitted and received through a corresponding module. According to an embodiment of the present disclosure, at least some, such as two or more of the cellular module 1721, the Wi-Fi module 1723, the BT module 1725, the GNSS module 1727, and the NFC module 1728 may be included in one integrated chip (IC) or IC package.

The RF module 1729 transmits/receives a communication signal, such as an RF signal. The RF module 1729 may include, for example, a transceiver, a power amp module (PAM), a frequency filter, a low noise amplifier (LNA), or an antenna. According to another embodiment of the present disclosure, at least one of the cellular module 1721, the Wi-Fi module 1723, the BT module 1725, the GNSS module 1727, and the NFC module 1728 transmits and receives RF signals through a separate RF module.

The SIM 1724 may include, for example, a card including a subscriber identity module and/or an embedded SIM, and may contain unique identification information, such as an integrated circuit card identifier (ICCID) or subscriber information, such as an international mobile subscriber identity (IMSI).

The memory may include, for example, an embedded memory 1732 or an external memory 1734. The embedded memory 1732 may include at least one of a volatile memory, such as a dynamic random access memory (DRAM), a static RAM (SRAM), or a synchronous dynamic RAM (SDRAM) and a non-volatile memory, such as a onetime programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND flash memory or a NOR flash memory, a hard disk drive, and a Solid State Drive (SSD).

The external memory 1734 may further include a flash drive such as a compact flash (CF), a secure digital (SD) card, a micro secure digital (Micro-SD) card, a mini secure digital (Mini-SD) card, an extreme digital (xD) card, a multi-media card (MMC), or a memory stick. The external memory 1734 may be functionally and/or physically connected to the electronic device 1701 through various interfaces.

The sensor module 1740 measures a physical quantity or detects an operation state of the electronic device 1701, and converts the measured or detected information into an electrical signal. The sensor module 1740 may include, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H, such as a red, green, blue (RGB) sensor, a biometric sensor 1740I, a temperature/humidity sensor 1740J, a illuminance sensor 1740K, and a ultraviolet (UV) sensor 1740M. Additionally or alternatively, the sensor module 1740 may include, for example, an E-nose sensor, an electromyography (EMG) sensor, an electroencephalogram (EEG) sensor, an electrocardiogram (ECG) sensor, an Infrared (IR) sensor, an iris sensor, a vein recognition sensor, an ultrasonic sensor and/or a fingerprint sensor. The sensor module 1740 may further include a control circuit for controlling one or more sensors included therein. According to an embodiment of the present disclosure, the electronic device 1701 may further include a processor configured to control the sensor module 1740 as a part of, or separately from, the processor 1710, and controls the sensor module 1740 while the processor 1710 is in a sleep state.

The input device 1750 may include, for example, a touch panel 1752, a (digital) pen sensor 1754, a key 1756, and an ultrasonic input unit 1758. The touch panel 1752 may use at least one of, for example, a capacitive type, a resistive type, an infrared type, and an ultrasonic type. The touch panel 1752 may further include a control circuit, and a tactile layer that provides a tactile reaction to a user.

The (digital) pen sensor 1754 may include, for example, a recognition sheet, which is a part of the touch panel or is separated from the touch panel. The key 1756 may include, for example, a physical button, an optical key or a keypad. The ultrasonic input device 1758 may detect, through a microphone, ultrasonic waves generated by an input means, and determines data corresponding to the detected ultrasonic waves.

The display 1760 may include a panel 1762, a hologram device 1764, or a projector 1766. The panel 1762 may be embodied to be, for example, flexible, transparent, or wearable. The panel 1762 and the touch panel 1752 may be embodied as one module. The hologram device 1764 may show a three dimensional image in the air by using an interference of light. The projector 1766 displays an image by projecting light onto a screen. The screen may be located, for example, inside or outside the electronic device 1701. According to an embodiment of the present disclosure, the display 1760 may further include a control circuit for controlling the panel 1762, the hologram device 1764, or the projector 1766.

The interface 1770 may include, for example, a high-definition multimedia interface (HDMI) 1772, a universal serial bus (USB) 1774, an optical interface 1776, or a d-subminiature (D-sub) 1778. Additionally or alternatively, the interface 1770 may include, for example, a mobile high-definition link (MHL) interface, a secure digital (SD) card/multi-media card (MMC) interface, or an infrared data association (IrDA) standard interface.

The audio module 1780 may bilaterally convert, for example, a sound and an electrical signal. At least some components of the audio module 1780 may be included in, for example, an input/output interface. The audio module 1780 processes sound information that is input or output through, for example, a speaker 1782, a receiver 1784, earphones 1786, or a microphone 1788 for example.

The camera module 1791 photographs a still image and a dynamic image. According to an embodiment of the present disclosure, the camera module 1791 may include one or more image sensors, such as a front sensor or a back sensor, a lens, an image signal processor (ISP) or a flash, such as a light emitting diode (LED) or xenon lamp.

The power management module 1795 may manage, for example, power of the electronic device 1701. According to an embodiment of the present disclosure, the power management module 1795 may include a power management integrated circuit (PMIC), a charger integrated circuit (IC), or a battery gauge. The PMIC may have a wired and/or wireless charging scheme. Examples of the wireless charging method may include, for example, a magnetic resonance method, a magnetic induction method, and an electromagnetic wave method. Additional circuits, such as a coil loop, a resonance circuit, or a rectifier, for wireless charging may be further included. The battery gauge measures, for example, the residual quantity of the battery 1796, and voltage, current, or temperature during the charging, and may include a rechargeable battery and/or a solar battery.

The indicator 1797 displays a particular state, such as a booting state, a message state, or a charging state, of the electronic device 1701 or a part of the electronic device 1701. The motor 1798 converts an electrical signal into mechanical vibration, and generates vibration or a haptic effect, for example. The electronic device 1701 may include a processing device for supporting a mobile television (TV). The processing device processes media data according to a certain standard such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Some of the hardware components according to embodiments may be combined into one entity, which performs functions identical to those of the relevant components before the combination.

The term "module" as used herein may, for example, indicate a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate array (FPGA), and a programmable-logic device for performing known operations or operations to be developed hereinafter.

According to embodiments, at least some of the devices or the method according to the present disclosure may be implemented by a command stored in a computer-readable storage medium in a programming module form. The instructions, when executed by a, may cause the one or more processors to execute the function corresponding to the instruction.

The computer readable recoding medium may include a hard disk, a floppy disk, magnetic media, such as a magnetic tape, optical media, such as a compact disc read only memory (CD-ROM) and a digital versatile disc (DVD), magneto-optical media, such as a floptical disk, a hardware device, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added.

According to embodiments of the present disclosure, there is provided a storage medium that stores instructions, wherein the instructions are set to enable at least one processor to execute at least one operation when the instructions are executed by at least processor, the at least one operation including: determining a security level associated with an application or a service of which execution is requested; changing at least some of a graphic object based on the determined security level and displaying the same; obtaining an input through a body of rotation included in the electronic device; and executing the application or the service when the input corresponds to security information associated with the application or the service.

Embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device, comprising:
   a housing;
   a body of rotation formed in one side of the housing;
   a display formed in one lateral side of the housing; and
   a processor that:
   determines a security level associated with an application or a service of which execution is requested:
   determines, based on a rotation of the body of rotation, information associated with a rotation direction of the body of rotation, a number of rotations of the body of rotation, and a rotation angle of the body of rotation;
   displays a graphic object for indicating the information through the display; and
   executes the application or the service when the information corresponds to information set for the application or the service,
   wherein the body of rotation is rotatable with respect to the display.

2. The electronic device of claim 1, wherein the body of rotation includes a bezel or a stem.

3. The electronic device of claim 1, further comprising:
   a memory that stores information set for each of a plurality of applications or information set for each of a plurality of services.

4. The electronic device of claim 3, wherein the information includes information associated with authentication.

5. The electronic device of claim 4, wherein the information associated with the authentication is with respect to an external electronic device.

6. The electronic device of claim 1, wherein the processor further:
   executes a first function of the application or the service when the rotation direction is a first rotation direction; and
   executes a second function of the application or the service when the rotation direction is a second rotation direction.

* * * * *